United States Patent [19]
Ackley

[11] Patent Number: 5,514,858
[45] Date of Patent: May 7, 1996

[54] METHOD AND APPARATUS FOR DECODING UNRESOLVED COMPLEX MULTI-WIDTH BAR CODE SYMBOLOGY PROFILES

[75] Inventor: H. Sprague Ackley, Seattle, Wash.

[73] Assignee: Intermec Corporation, Everett, Wash.

[21] Appl. No.: 386,745

[22] Filed: Feb. 10, 1995

[51] Int. Cl.$^6$ ........................................ G06K 7/10
[52] U.S. Cl. ........................................ 235/462
[58] Field of Search .................. 235/462, 469, 235/454, 463

[56] References Cited

U.S. PATENT DOCUMENTS

| | | | |
|---|---|---|---|
| 1,985,035 | 12/1934 | Kermode et al. | 209/111 |
| 2,612,994 | 10/1952 | Woodland et al. | 209/111 |
| 3,359,405 | 12/1967 | Sundblad | 235/61.11 |
| 3,622,758 | 11/1971 | Schanne | 235/61.11 E |
| 3,784,792 | 1/1974 | Dobras | 235/61.11 E |
| 4,013,893 | 3/1977 | Hertig | 250/568 |
| 4,056,710 | 11/1977 | Shepardson et al. | 235/437 |
| 4,379,224 | 4/1983 | Engstrom | 235/463 |
| 4,687,942 | 8/1987 | Takagi et al. | 250/556 |
| 4,916,298 | 4/1990 | Raphaël | 235/463 |
| 4,980,544 | 12/1990 | Winter | 235/436 |
| 5,080,456 | 1/1992 | Katz et al. | 359/214 |
| 5,097,263 | 3/1992 | Delpech et al. | 341/155 |
| 5,231,293 | 7/1993 | Longacre, Jr. | 250/568 |
| 5,268,562 | 12/1993 | Lazaridis | 235/462 X |
| 5,276,315 | 1/1994 | Surka | 235/462 |
| 5,376,780 | 12/1994 | Klueter | 235/462 |
| 5,389,770 | 2/1995 | Ackley | 235/462 X |

FOREIGN PATENT DOCUMENTS

| | | |
|---|---|---|
| 0262924 | 4/1988 | European Pat. Off. . |
| 0385783 | 9/1990 | European Pat. Off. . |
| 2635207 | 2/1990 | France ............... G06F 15/66 |
| WO88/02521 | 4/1988 | WIPO ............... G06K 7/10 |

OTHER PUBLICATIONS

*Bar Code Print Quality Guideline*, American National Standards Institute, New York, pp. 1–28, Jan. 1990.

Barkan, Eric and David Sklar, "Effects of Substrate Scattering on Bar–Code Scanning Signals," *SPIE* 362:196–212, Aug. 1981.

Barkan, Eric and Jerome Swartz, "Depth of Modulation and Spot Size Selection in Bar Code Laser Scanners," *SPIE's 25th Annual International Technical Symposium*, San Diego, California, Aug. 24–Aug. 28, 1981, pp. 1–15.

H. Sprague Ackley, *Substrate Distortion—Historical Papers by IBM and RCA*, Rev. A, Dec. 4, 1991, Nicastro, L. J. "Report on Unsymmetrical Signals in the Supermarket Scanner," pp. 1–5, Jan. 21, 1970, and The 'Shrinking White Bar Effect' Observed in the Piranha Bar Code Scanner, pp. 1–10, Apr. 10, 1973.

*Primary Examiner*—Donald T. Hajec
*Assistant Examiner*—Thien Minh Le
*Attorney, Agent, or Firm*—Seed and Berry

[57] ABSTRACT

A method and apparatus for decoding profiles which fail to resolve narrow elements in complex multi-width symbols, first begins by identifying which elements in the profile are resolved. Second, the environments surrounding each resolved element are examined. Third, several closure boundaries are determined, and the widths of resolved elements are determined at a selected threshold. The size of each resolved element is determined based on its measured width at a threshold selected based on the environment surrounding the resolved element. Fourth, the distances between the centers of the resolved elements are determined. Thereafter, an X-dimension is determined for 1-wide narrow elements unresolved in the profile. Based on the X-dimension and known center distances, a matrix is constructed for determining the number of narrow elements unresolved between two resolved elements. Based on the measured center distances, the resolved element widths and the matrix, all of the elements are identified in the profile and the profile is subsequently decoded.

52 Claims, 17 Drawing Sheets

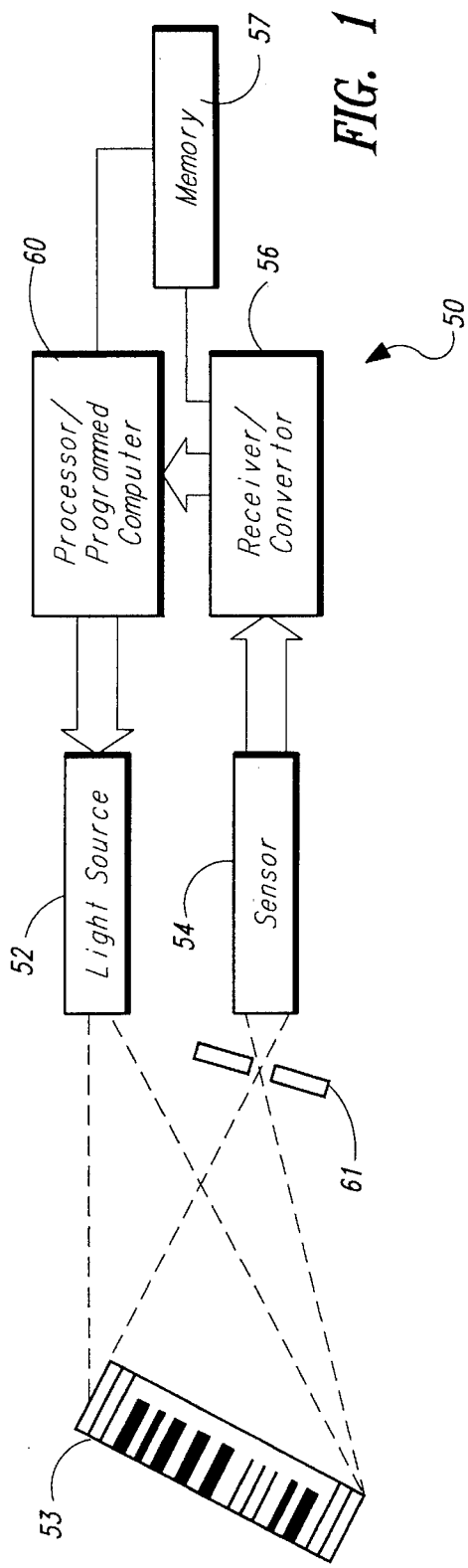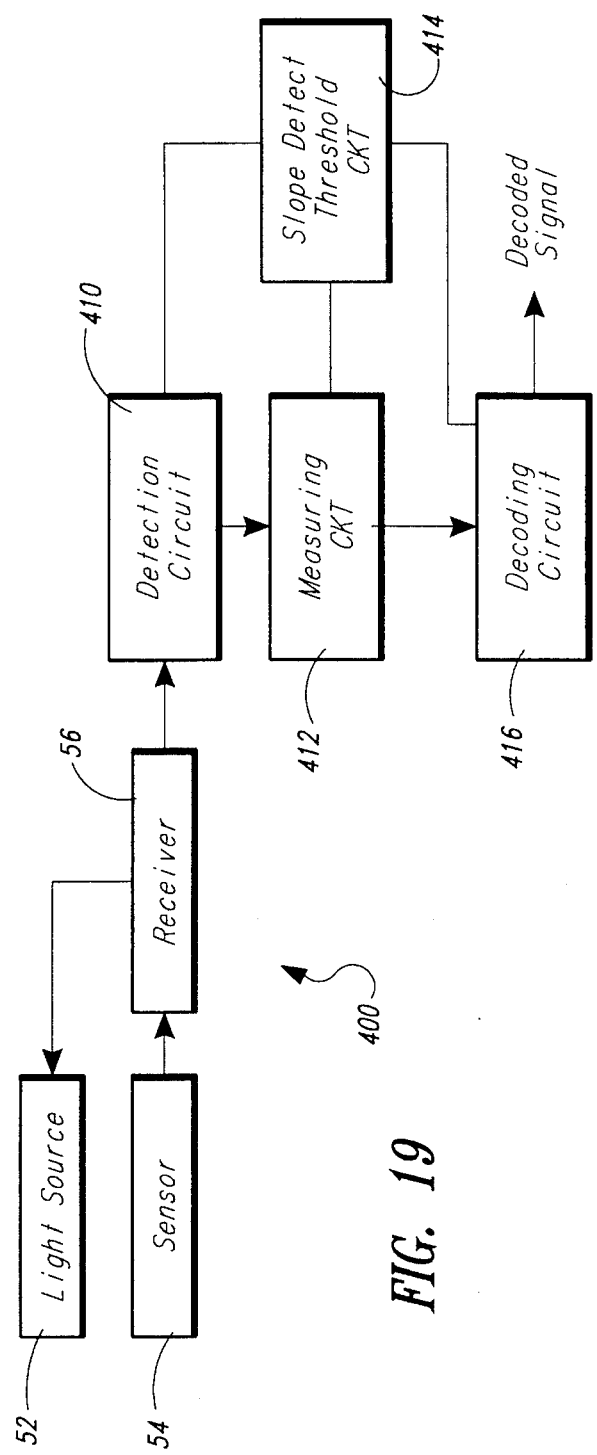
FIG. 1
FIG. 19

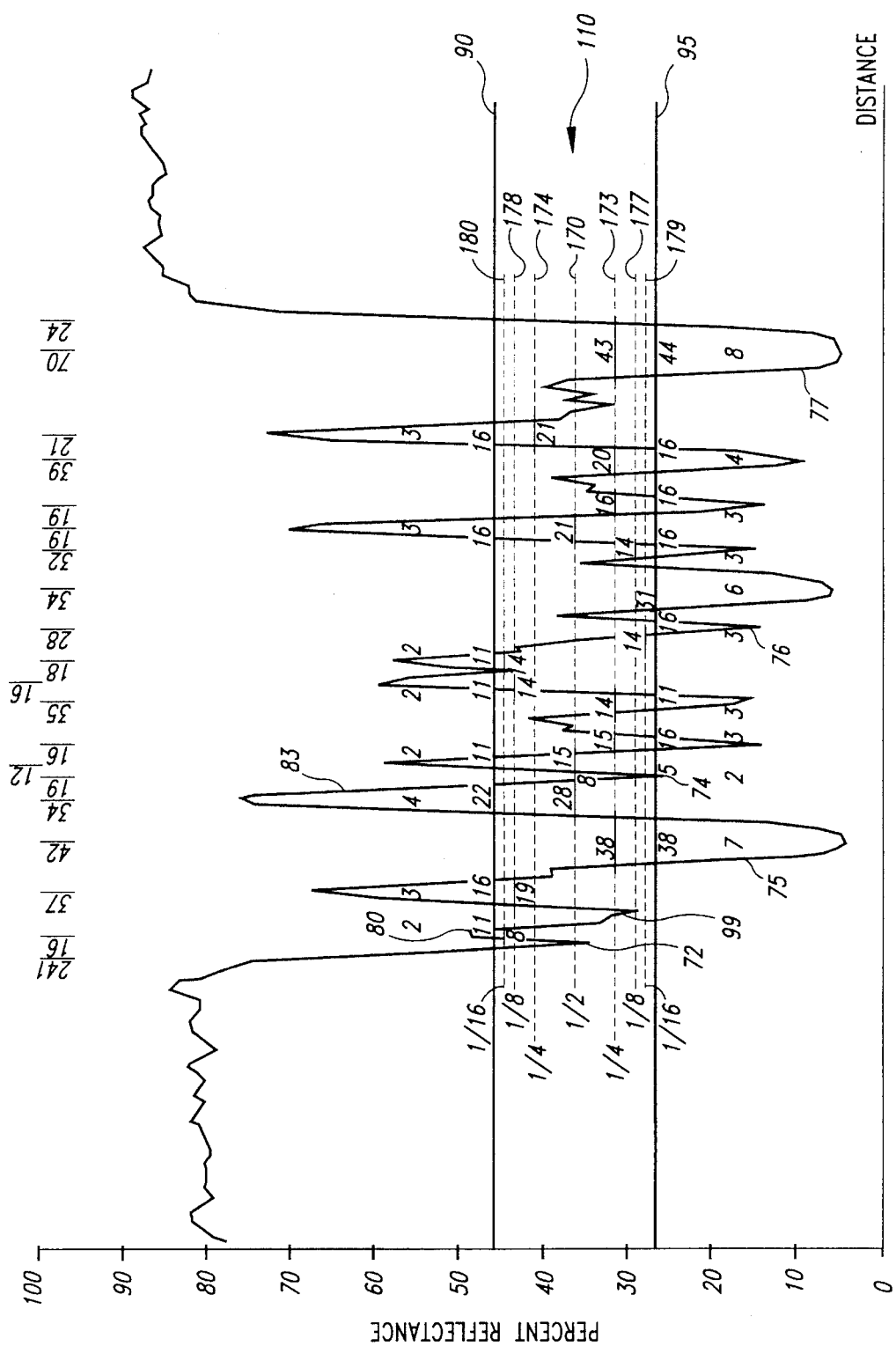

DECODE MATRIX

| | | | | | | | | | | | | | | | | | | | | |
|---|---|---|---|---|---|---|---|---|---|---|---|---|---|---|---|---|---|---|---|---|
| 124 — Measured Center Distance Between Resolved Element Pairs | 241 | 16 | 37 | 42 | 34 | 19 | 12 | 16 | 35 | 16 | 18 | 28 | 34 | 32 | 19 | 19 | 39 | 21 | 70 | 24 |
| 126 — Measured Width of Resolved Element* at Appropriate Threshold | | 8 | 19 | -38 | 28 | -8 | 15 | -16 | | -14 | 14 | 14 | -14 | -31 | -14 | 21 | -16 | -20 | | -43 |
| 128 — Size of Resolved Element* | | 2 | 3 | -7 | 4 | -2 | 2 | -3 | 3 | -3 | 2 | 2 | -3 | -6 | -3 | 3 | -3 | -4 | | -8 |
| 130 — Number of Unresolved 1-Width Elements Lost Between Resolved Elements | | 1 | 3 | 2 | 0 | 0 | 0 | 0 | 3 | 0 | 1 | 2 | 1 | 1 | 0 | 0 | 3 | 3 | 6 | |
| 132 — Resulting String of Element Widths | 1 | 2 111 | 3 | 11 7 | 4 | 2 | 2 | 3 111 | 3 | 2 1 | 2 | 11 3 | 3 1 | 6 | 1 | 3 | 3 111 | 3 111 4 | 3 1111 8 | |
| 134 — String of Elements Parsed into Characters | 1 | 2 1 | 1 3 | 1 1 | 7 4 | 2 | 3 1 | 1 1 | 3 | 2 1 | 1 2 | 1 1 3 | 1 6 | 1 6 | 3 3 | 3 1 | 1 4 | 3 | 1 1 | 1 8 |

*A positive value indicates a space (high reflectance) while a negative value indicates a bar (low reflectance).

*FIG. 17*

METHOD AND APPARATUS FOR DECODING UNRESOLVED COMPLEX MULTI-WIDTH BAR CODE SYMBOLOGY PROFILES

TECHNICAL FIELD

The present invention relates to methods and apparatus for decoding profiles produced from machine-readable symbols, and more particularly, to methods and apparatus for decoding unresolved profiles.

BACKGROUND OF THE INVENTION

Bar code symbologies ("bar codes") are widely used for data collection. The first bar code symbologies developed, such as U.P.C., EAN, Code 39, Codabar, Interleaved 2 of 5, and Code 93 can be referred to as "linear symbologies" because data in a given symbol is decoded along one axis or direction. Linear symbologies generally encode data characters as parallel arrangements of alternating, multiple-width strips of lower reflectivity or "bars" separated by the absences of such strips having higher reflectivity or "spaces." Each unique pattern of bars and spaces within a predetermined width defines a particular data character. A given linear symbol encodes several data characters along its length as several groups of unique bar and space patterns.

Simpler linear symbologies such as Code 39 employ two element widths. An "element" is a single bar or a single space, and in 2-width symbologies, each character in the symbology generally includes a combination of four narrow and wide elements: a single-width bar, a single-width space, a double-width bar or a double-width space. More complex symbologies employ a greater number of widths for each element. For example, the U.P.C. symbology employs four widths, thus allowing for a combination of eight elements. The Code 49 symbology employs six element widths. The PDF417 symbology employs spaces having six possible widths and bars having eight possible widths, where each symbol character has four bars and four spaces having a constant length of 17 times the X-dimension. The "X-dimension" is the nominal width dimension of the narrowest bars and spaces in bar code symbology. The wider bars and spaces in that symbology are based on integer multiples of the X-dimension. For example, the largest element in the U.P.C. symbology is four times wider than the narrowest element, while in PDF417 the largest element is a bar eight times wider than the narrowest bar.

Currently available bar code readers transmit light to a bar code, which is reflected back to a light sensor within the reader. The sensor produces a profile based on the light reflected from the bar code. The bar code "profile" is generally an analog signal representing the modulated light reflected from the spaces and absorbed by the bars in the bar code and thereby represents the pattern of bars and spaces in a given bar code. In a given profile, a peak generally corresponds to a space (high reflectivity), while a valley corresponds to a bar (low reflectivity, relative to a space), and the width of each peak or valley generally indicates the width of the corresponding bar or space whose reflectance produced the peak or valley. Currently available readers determine the edges in the profile, typically using an electronic thresholding or other square-wave generating circuit that converts the profile into either a high or low value. The reader then decodes the "squared-off" signal based on the transitions or edges between high and low values.

Some bar code readers employ hand-held wands which contact the surface on which the bar code is printed. Such readers often produce profiles having sharp contrast between the peaks and valleys and thus the spaces and bars represented by the profile are easily detectable by circuitry in the reader. However, wand-type readers require the wand to contact the surface on which the bar code is printed, and are thus impractical in situations where a user cannot or does not wish to physically contact the bar code. In a hand-held reader, requiring the user to manually contact each bar code is time consuming and reduces productivity.

Non-contact bar code readers are currently available such as laser scanning and linear charge-coupled device ("CCD") readers. Laser scanning-type readers employ a scanning beam of laser light which impinges on and is reflected from a bar code. A photodetector receives the reflected light and converts it into a modulated electrical signal that comprises the profile for the bar code.

Image or vision-based readers employ two-dimensional semiconductor arrays, vidicons, or other suitable light receiving elements that receive an image of a bar code and, based on the light reflected therefrom, process the image to produce the profile.

Due to optical system limitations inherent in laser- or image-type readers, these readers have a specified depth-of-field within which bar codes can be read. Some laser- or image-type readers employ autofocus systems to increase the depth-of-field for the reader. However, even readers with autofocus systems are limited by the depth-of-field of the autofocus system. Additionally, autofocus systems are costly and slow.

If a reader scans or images a bar code out of its depth-of-field, the resulting profile will exhibit "closure." Positive ink spread in a bar code or excessive noise in a profile can also produce closure. Closure in a bar code profile is evidenced by some recognizable peaks and valleys, but also ripples in the middle of the profile. Closure in a bar code profile generally indicates that the wide elements in the profile are resolved, but that the narrow elements are unresolved. With respect to readers, a space or bar is "resolved" if the reader is able to identify a peak or valley in the profile that corresponds to the given space or bar. Some profiles may represent narrow elements by small peaks, valleys or ripples that are visually recognizable, but which are essentially undetectable by current readers.

Currently available readers are unable to decode profiles having closure. These readers employ electronic circuits such as thresholding circuits, or other methods, to find the edges of bar code elements represented in a profile. To decode each element in the bar code, these electronic circuits locate an edge of an element as a point where, e.g., the reflectance in the profile reaches a fixed distance from a peak or valley. Currently available readers cannot decode profiles where the narrow elements are out of focus or lost in the profile (i.e., profile closure) because the narrow elements fail to produce any significant peaks or valleys and thus the electronic circuitry is unable to locate any edges in the profile corresponding to these elements. Since current electronic circuits cannot locate the narrow elements in a profile when closure occurs, the circuits cannot decode the bar code.

Due to the shortcomings of such circuits, a user of a hand-held non-contact reader without autofocus must adjust the distance at which the user holds the reader from the bar code until the bar code is within the depth-of-field (i.e., in-focus) for the reader. Once in-focus, the circuitry can decode the bar code. If a user is attempting to read bar codes at varying distances, the user must constantly move the reader to place a given bar code within the focus for the reader so as to read that bar code. Consequently, while non-contact readers eliminate the need to contact the surface on which the bar codes is printed, reading each bar code is still time consuming since the user must move the reader to a specific in-focus position for the reader. If the reader is mounted in a fixed location (and lacks autofocus capabilities), and bar codes to be read pass by the reader at different distances, for example, when the reader is mounted above a conveyor on which boxes of varying heights are carried for reading bar codes atop the boxes, only those bar codes within the reader's fixed depth-of-field will be decoded.

Overall, the inventor is unaware of methods or apparatus, other than his own, for decoding profiles from various types of bar code symbologies when such profiles exhibit closure due to, e.g., symbols being read outside of the reader's depth-of-field, noise generated from electronics or printing defects, or when a given reader attempts to read symbols having an X-dimension smaller than that capable of being read by the reader. Furthermore, the inventor is unaware of methods or apparatus for decoding profiles from complex bar code symbologies such as PDF417.

SUMMARY OF THE INVENTION

As represented in the claims below, the present invention, in a broad sense, embodies a method of decoding a machine-readable symbol representing encoded information. The symbol includes a plurality of spaced two-dimensional geometric shapes, the shapes and spaces between the shapes having sizes with at least first, second and third widths in at least one direction. The second and third widths are greater than the first width. The method includes the steps of: (i) receiving light reflected from the symbol and producing an output signal therefrom that represents the reflectance of the shapes and spaces comprising the symbol; (ii) receiving the output signal and producing a wide feature signal that resolves at least some of the shapes and spaces having the second and third widths, but which fails to resolve at least some of the shapes and spaces having a first width; (iii) receiving the wide feature signal and determining which of the shapes and spaces are resolved by identifying a plurality of portions in the wide feature signal that correspond to the resolved shapes and spaces; (iv) determining the size of each of the resolved shapes and spaces; (v) generating a lost element matrix in response to the wide feature signal and the size of the resolved shapes and spaces; and (vi) determining the information encoded in the symbol based on the lost element matrix and the size of the resolved shapes.

Similarly, the present invention embodies an apparatus for decoding the machine-readable symbol. The apparatus includes a sensor that receives light that is reflected from the machine-readable symbol and produces an output signal therefrom that represents the reflectance of the shapes and spaces comprising the symbol. A receiver receives the output signal and produces a large shape signal that indicates at least some of the shapes and spaces having the second or third widths, but fails to produce a signal indicative of at least some of the shapes and spaces having the first width. A processor processes the large shape signal and produces a signal indicative of the information included in the symbol. The processor: (i) determines which of the shapes and spaces are resolved by identifying a plurality of portions in the large shape signal that each correspond to one of the resolved shapes and spaces, (ii) determines the size of the resolved shapes and spaces; (iii) generates a lost element matrix in response to the large shape signal and the size of the resolved shapes and spaces, and (iv) produces a signal indicative of the information encoded in the symbol based on the lost element matrix and the size of the resolved shapes.

Other features and associated advantages of the present invention will become apparent from studying the following detailed description, together with the accompanying drawings.

BRIEF DESCRIPTION OF THE DRAWINGS

FIG. 1 shows a block diagram of a data collection symbology reader of the present invention reading a bar code symbol.

FIG. 16 shows the profile of FIG. 15 with the sizes of the resolved elements indicated with respect to the profile.

FIG. 17 is a table showing an example of the intermediate values determined during the steps shown in the flowchart of FIGS. 14A, 14B and 14C for the inventive method of decoding unresolved profiles.

FIG. 19 shows a block diagram of an alternative data collection symbology reader using the present invention.

DETAILED DESCRIPTION OF THE PRESENTLY PREFERRED EMBODIMENT

Figure 2:
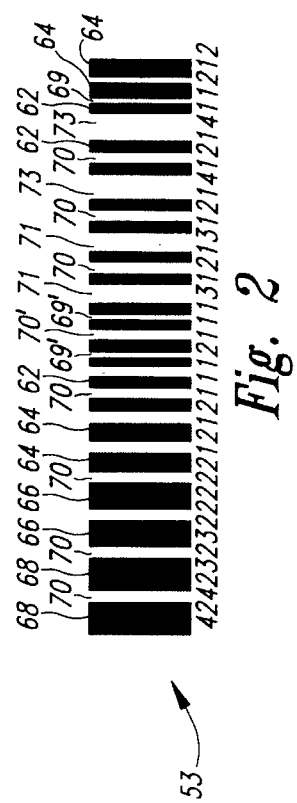
FIG. 2 shows the bar code symbol of FIG. 1 enlarged.

As shown in FIG. 1, a data collection symbology reader 50 of the present invention includes a light source 52 that illuminates a data collection or other symbol 53 (shown more clearly in FIG. 2). As used herein, a "data collection symbol" refers to a symbol from any linear, stacked, area and other machine readable symbology. A "stacked symbology," as used herein, refers to any symbology, such as PDF417 and Code 49, that generally employs several adjacent rows of symbols, each row having several characters defined by groups of multiple-width bars and spaces. An area symbology, as used herein, refers to any symbology, such as Data Matrix or Code One, that employs a matrix of data cells, rather than one or more rows of bars and spaces. Rather than being from a specific symbology, the symbol 53 is an exemplary symbol showing a theoretical pattern with 2-wide spaces surrounded by a variety of like-sized elements for purposes of determining the effects of such surrounding elements, as will be discussed more thoroughly below.

A sensor 54 in the reader 50 receives the light reflected from the symbol 53 and converts the received light into an electrical signal. For example, the light source 52 can be a rasterizing laser while the sensor 54, in turn, can be a photodetector. Alternatively, the light source 52 can be an LED, flash bulb, infrared light source, or other light-emitting element, while the sensor 54 can be a CCD, semiconductor array, vidicon, or other area imager capable of converting received light into electrical signals.

A receiver or converter 56 receives the electrical signal from the sensor 54 and converts it into a signal to be processed by a programmed computer or processor 60. Typically, the sensor 54 produces an analog signal that represents the modulated light reflected from the elements in the symbol 53. Importantly, if the processor 60 is a digital computer, then the converter 56 converts the profile from an analog signal produced by the sensor 54 to a multi-level digital signal that numerically represents the various amplitudes of the analog signal. The converter 56 and/or processor 60 are coupled to memory 57 for storing the profile in digital form.

Figure 3:
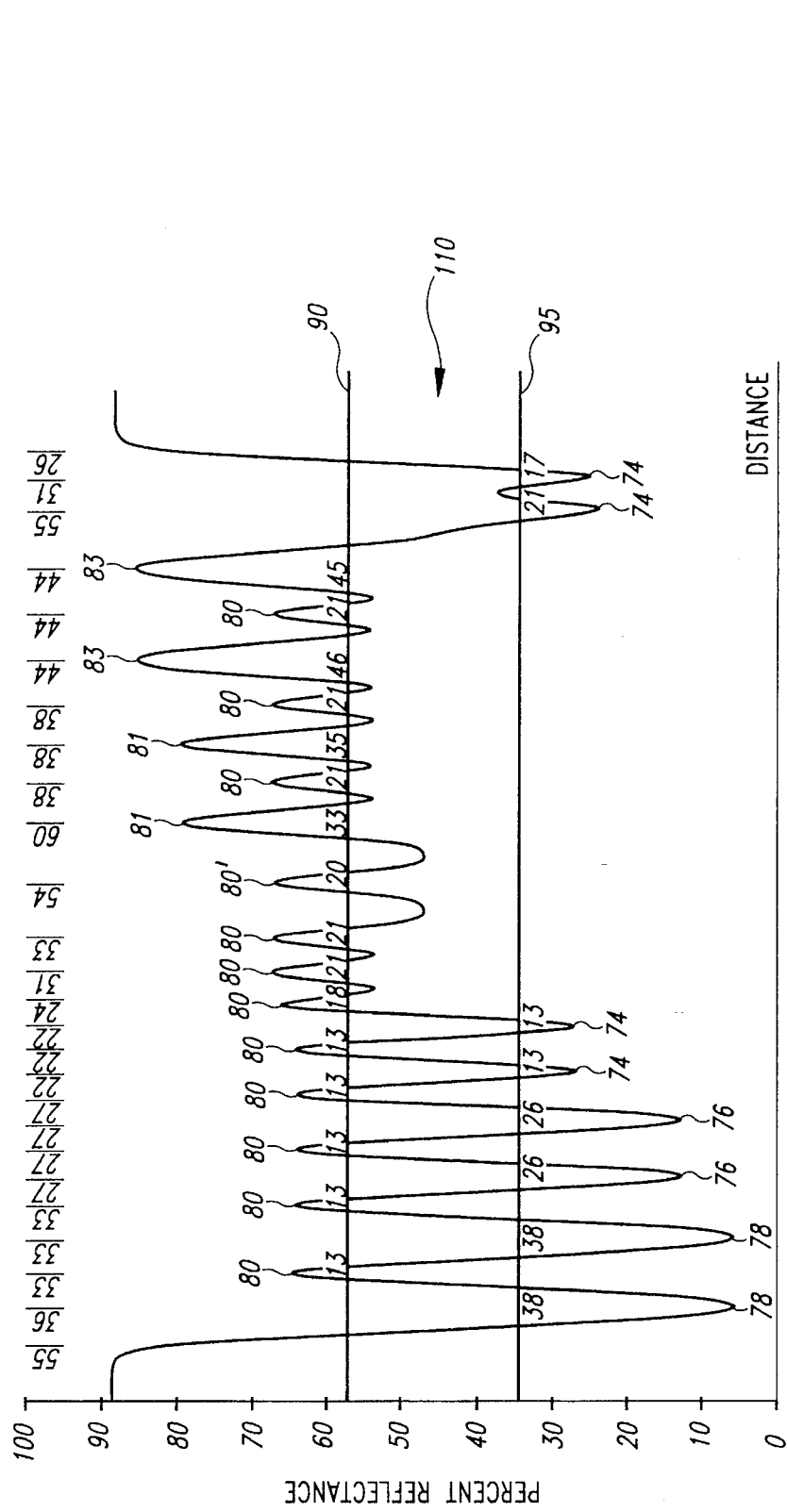
FIG. 3 is an example of an unresolved profile of the symbol of FIG. 2 produced by the reader of FIG. 1 having an aperture of approximately 2.6 times the X-dimension for the symbol.

The sensor 54 produces a profile such as shown in FIG. 3, depending upon the modulated light received from that symbol 53 and the size of an aperture 61 preceding the light detector in the sensor. The vertical scale in most profiles is percent reflectance ranging from 0% to 100%. The horizontal scale in most profiles is not known absolutely, but rather is in relative units, such as distance across the symbol or time. When decoding a profile, it is not necessary to know the horizontal spacing in measurement units, but rather the relative widths or distances between elements represented by peaks or valleys in the profile.

In most readers, the aperture 61 must be smaller than the minimum size of an element (i.e., the X-dimension) in a data collection symbol to be read by the reader so as to produce a profile that adequately resolves all elements in the symbol. FIG. 3, however, shows a closure profile produced by an aperture 61 that is 1.8 times the X-dimension for the symbol 59 (i.e., nearly greater than 2X). Most bar code readers employ a circular aperture 61 whose diameter is equal to approximately 0.8X. The symbol 53, from which the profile of FIG. 3 was produced, is a symbol printed with minor positive ink spread. In addition to large apertures 61, marginal print quality further promotes closure in profiles as explained more fully below. Furthermore, attempting to image a symbol using an imager having a resolution less than that of the X-dimension of a symbol also produces closure in profiles.

As identified in FIG. 2, the left side of the symbol 53 includes several 2-wide spaces 70 surrounded by a variety of like-sized elements such as 1-wide bars 62, 2-wide bars 64, 3-wide bars 66 and 4-wide bars 68. The right side of the symbol 53 shows 2-wide spaces 70 separated from other 2-wide spaces, 3-wide spaces 71, and 4-wide spaces 73. The 2-wide spaces 70 are separated from other spaces by 1-wide bars 62, referred to herein as "singlets." The widths of the elements in the symbol 53 are shown in FIG. 2 below the symbol as a string of numbers.

The 2-, 3- and 4-wide bars 64, 66 and 68 in FIG. 2 produce valleys 74, 76 and 78 shown in FIG. 3, respectively, that all have less than 30% reflectance. Conversely, the 2-, 3- and 4-wide spaces 70, 71 and 73 produce peaks 80, 81 and 83 respectively, that all have greater than 60% reflectance. The 1-wide bar 62, however, produces a valley 72 having a reflectance substantially greater than 30%, while the 1-wide space 69 fails to produce any recognizable peak, and thus the 1-wide elements are unresolved in the profile of FIG. 3.

For example, FIG. 3 shows two 1-wide spaces 69' in the symbol 53 bounded by 1-wide bars 62, which together, separate a 2-wide space 70'. The 2-wide space 70' produces a peak 80' and the 1-wide bars 62 bounding the 1-wide spaces 69' produce flattened valleys 72' in the profile of FIG. 3. The 1-wide spaces 69' fail to produce any recognizable peak.

In general, the unresolved 1-wide or "narrow" elements in a closure profile are represented, if at all, by small peaks, valleys, inflection points or other ripples in the middle of the profile. Conversely, the resolved 2-wide or greater, or "wide" elements, are represented by high peaks or low valleys, extending near the top or bottom of the profile. As shown in FIG. 3, for example, the highest peaks rise to approximately 85% reflectance and the lowest valleys dip to about 5% reflectance, corresponding to the resolved wide spaces and bars in the symbol 53, respectively. As a result, if two wide elements, such as two 2-spaces, are separated by a narrow element (i.e., a 1-wide bar 62), the resulting closure profile shows two high peaks that appear to be adjacent to each other in the profile. The narrow element fails to produce a significant enough valley to be detected by most readers because the adjacent wide elements have a large reflectance difference relative to the contrast of the narrow element.

Similarly, if a wide space is separated from a wide bar by two narrow elements (i.e., a 1-wide bar and 1-wide space), the resulting closure profile shows one high peak and one low valley that appear to be opposite to each other in the profile. For example, the right-hand portion of the symbol 53 shows a 4-wide space 73 separated from a 2-wide bar 64 by an intervening 1-wide bar 62 and 1-wide space 69. The 4-wide space 73 and the 2-wide bar 64 produce the peak 83 and valley 74, respectively. The narrow elements fail to produce any significant peak because the adjacent wide elements have a large reflectance difference relative to the contrast of the narrow elements. Consequently, the narrow elements fail to produce a substantial enough image to in turn produce a significant peak or valley in the profile. Instead, the narrow elements produce a gray image, which in turn, produces a ripple at the middle of the profile.

The symbol 53 of FIG. 2 shows 2-wide spaces 70 bounded by 4-wide, 3-wide, 2-wide and 1-wide bars 68, 66, 64 and 62 respectively, in the left half of the symbol, while the right half of the symbol shows 2-wide spaces bounded by 4-wide, 3-wide, 2-wide and 1-wide spaces 73, 71, 70 and 69, respectively. In other words, the symbol 53 shows 2-wide spaces 70 bounded symmetrically by pairs of similarly sized elements (i.e., symmetric element environments). Generally, elements of similar size are similarly numbered herein. Similarly, peaks or valleys in a profile produced by elements of a given size are similarly numbered herein.

The profile of FIG. 3, and all profiles described herein, show the distances in arbitrary units between the centers of resolved elements along the top of the profile. For the present invention, the units used can be a multiple of the quantization used by the processor 60. Alternatively, the units can be a multiple of a rate of a clock coupled to the processor, or the units can be related to the resolution of the sensor 54. The profile of FIG. 3 and other Figures herein also show the widths of resolved elements such as the peaks 80 produced by the 2-wide spaces 70 in arbitrary units as measured at an upper closure boundary 90. The upper closure boundary 90 and a lower closure boundary 95 enclose a "gray zone" or closure region 110 within the middle of the profile. The closure region 110 contains the unresolved 1-wide elements in the symbol 53 as represented, if at all, by ripples or inflection points in the middle of the profile.

Importantly, the 2-wide spaces 70 bounded by wide bars as shown on the left of the profile have the same width of 13 as measured at the upper closure boundary 90. In other words, a 2-wide space bounded by any combination of 2-wide through n-wide bars has the same width at the closure boundary 90, or "closure width." Similarly, as shown to the right of the profile, the 2-wide spaces 70 produce peaks 80 having identical closure widths of 21 when bounded by 3-wide and 4-wide spaces (shown as peaks 81 and 83, respectively).

Near the center of the profile, the 2-wide space 70' is bounded on both sides by three narrow elements, referred to herein as a "triplet," i.e., a 1-wide bar 62, a 1-wide space 69' and another 1-wide bar 62. The 2-wide bar 70' bounded on both sides by triplets produces a closure width of 20, which is slightly less than the width of 21, but greater than the width of 13. Overall, the profile FIG. 3 demonstrates that the width of a resolved space 70 as measured at the upper closure boundary 90 depends on the "environment" surrounding or bordering the element. If bounded by wide bars, the 2-wide space 70 produces a closure width of 13; if bounded by singlets and larger spaces, the 2-wide space produces a closure width of 21, while if bordered by triplets, the 2-wide space produces a closure width of 20. The term "environment," as used herein, generally refers to the element or elements immediately adjacent on the left and right of a given element.

Figure 4:
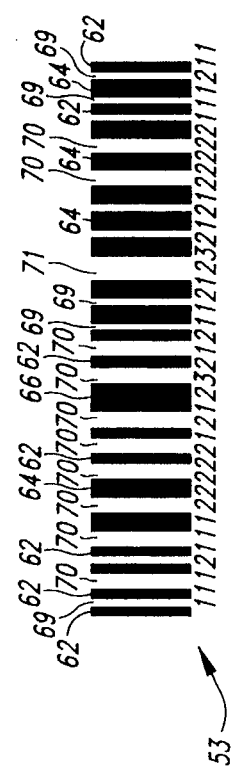
FIG. 4 shows another enlarged bar code symbol.

Nearly all data collection symbols include combinations of elements of various sizes adjacent to and, bordering a given element, i.e., non-symmetric element environments. FIG. 4 shows a symbol 5Y having, starting from the left side, a first 2-wide space 70 bounded by a pair of triplets, followed by a second 2-wide space 70 bounded by a triplet and a 2-wide bar 64. Thereafter, a third 2-wide space 70 is bordered by two 2-wide bars 64. A fourth 2-wide space 70 is bordered by a 2-wide bar and a singlet (i.e., 1-wide bar 62). A fifth 2-wide space 70 is bordered by two singlets, while a sixth 2-wide space is bordered by a singlet and a 3-wide bar 66. A seventh 2-wide space 70 is similarly bordered by the 3-wide bar 66 and a 1-wide bar 62, while an eighth 2-wide space is bordered by the 1-wide bar 62 and a "doublet," i.e., a 1-wide bar and a 1-wide space pair. The right side of the symbol 53' is identical to the left side, but inverted to demonstrate 2-wide bars 64 in a variety of environments.

Figure 5:
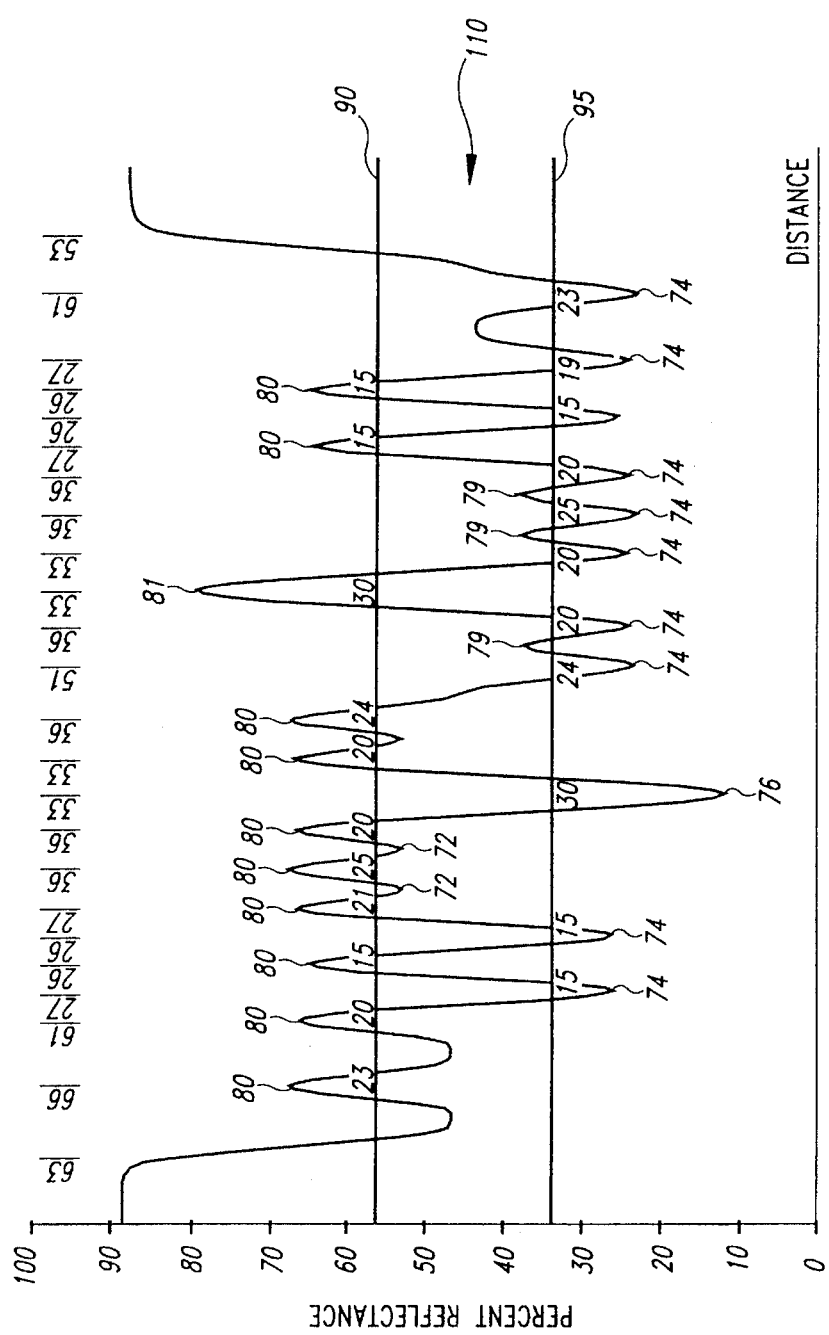
FIG. 5 shows an example of an unresolved profile of the symbol of FIG. 4 produced by the reader of FIG. 1 having an aperture of approximately 2.6 times the X-dimension of the symbol.

The closure profile of FIG. 5, taken from the symbol 53' of FIG. 4, shows the distances between the centers of resolved elements along the top, and the widths of the resolved elements as measured at the upper closure boundary 90 (for resolved spaces) and the lower closure boundary 95 (for resolved bars). The profile shows six basic element closure environments: singlet/singlet, singlet/doublet, triplet/triplet, singlet/2-wide, triplet/2-wide, and 2-wide/2-wide. Importantly, the profile of FIG. 5 shows that a given resolved element, such as a 2-wide space 70, produces peaks 80 having various closure widths as measured at the upper closure boundary 90. The 2-wide spaces 70 produce closure widths ranging from 15 when bordered by 2-wide bars 64 (the 2-wide/2-wide environment), to 25 when bordered by 1-wide bars 62 (the singlet/singlet environment). The 3-wide space 71 produces the peak 81 having a closure width of 30. Based solely on the closure width of 30 for the peak 81, the peak could be interpreted as a 2-wide space, given the wide range of closure widths measured for 2-wide spaces.

Figures 6, 13:
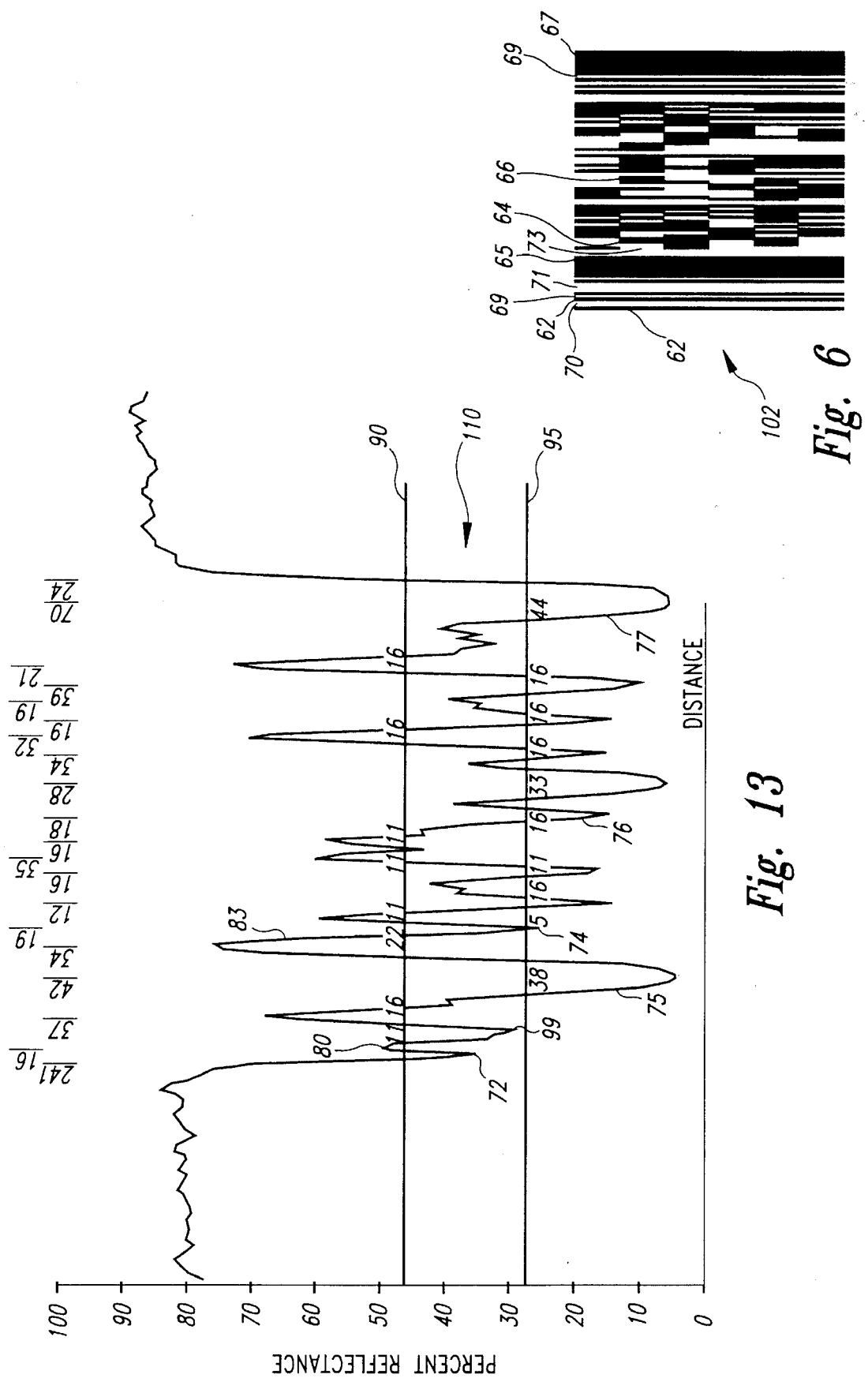
FIG. 6 is an enlarged PDF417 symbol.
FIG. 13 is an example of a profile of the second row from the symbol of FIG. 6 produced by an imager of the reader of FIG. 1 having approximately 98 CCD pixels, the profile having the distances between the centers of peaks and valleys in the profile, and the widths of the peaks and valleys, indicated with respect to the profile.

Overall, the profile of FIG. 5 shows that it can be difficult to identify what size a given resolved element is if the its size is determined solely by its closure width as measured at the upper or lower closure boundary 90 or 95, respectively. This is particularly true for complex symbologies employing many element widths, for example, PDF417. An example of a PDF417 symbol 102 is shown in FIG. 6. As noted above, the PDF417 symbology employs eight element widths for bars and six element widths for spaces. Due to the six possible environments surrounding resolved elements, it can be difficult to determine the size of a given resolved element based upon its closure width as measured at the closure boundary (e.g., whether a valley corresponds to a 3-wide or 4-wide bar).

FIGS. 7 through 12 illustrate how the 1-wide elements in the symbol 53 become unresolved or "lost" in profiles produced by the sensor 54 as its aperture 61 increases from 1.8X to 2.8X. Additionally, FIGS. 7 through 12 illustrate how the closure widths of resolved elements as measured at the upper and lower closure boundaries 90 and 95 differ depending upon the environments surrounding the resolved elements. Numbers across the tops of profiles in FIGS. 7 through 12 indicate the distance between the centers of resolved elements in arbitrary units. Horizontal lines labeled "top" and "bottom" are the upper and lower closure boundaries 90 and 95, which are lines drawn just above the highest valley in the spaces and slightly below the lowest peak in the bars. Numbers along the upper and lower closure boundaries 90 and 95 indicate the widths of resolved elements as measured at that boundary. (A determination of the closure boundaries is discussed more fully below.)

Figure 7:
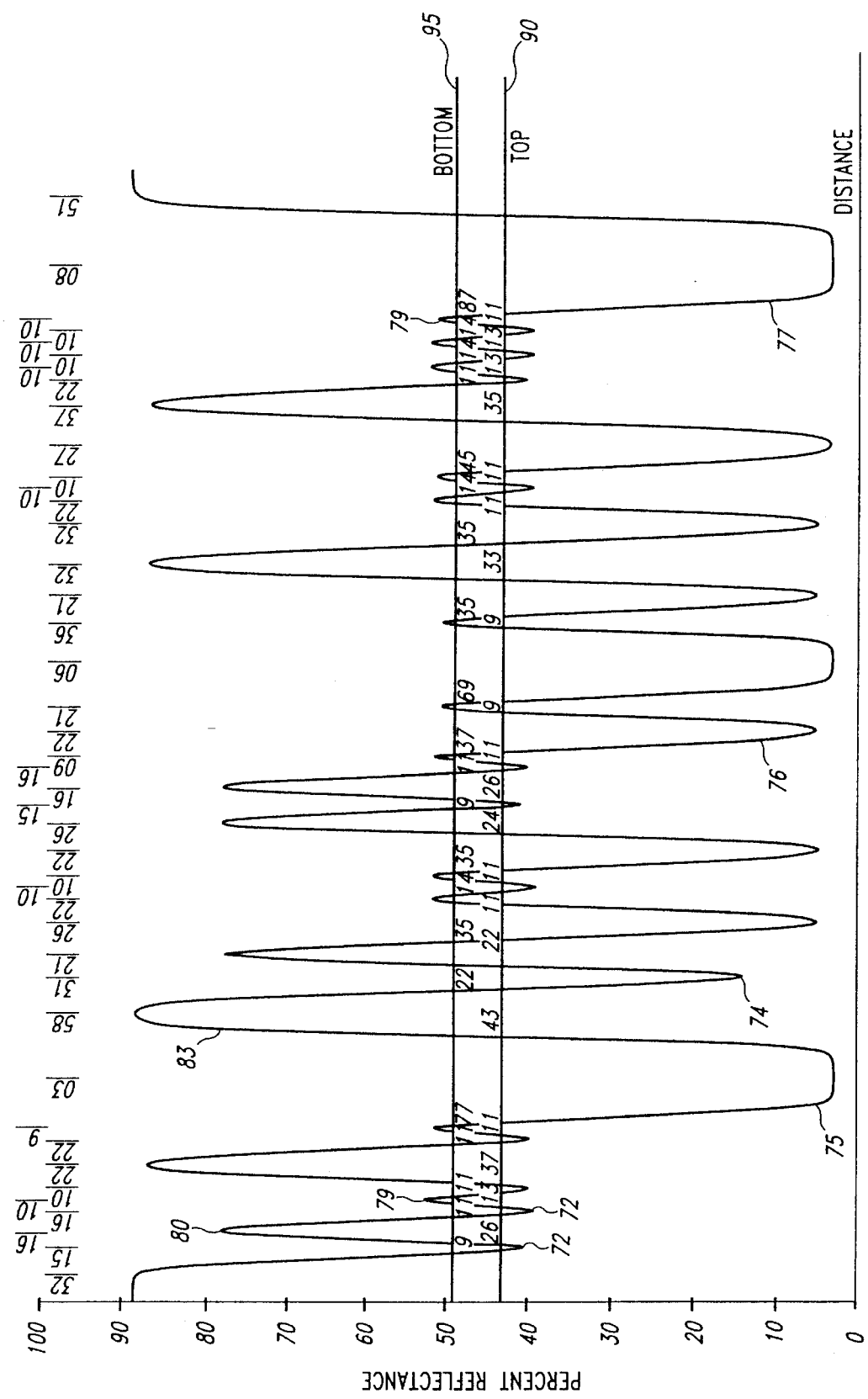
FIG. 7 is an example of a profile of the second row from the symbol of FIG. 6 produced by the reader of FIG. 1 having an aperture of 1.8 times the X-dimension of the symbol.

FIG. 7 shows a somewhat resolved profile produced from the second row from the top of the symbol 102 with an aperture 61 of 1.8X for the sensor 54. FIG. 7 is a somewhat resolved profile since the lower closure boundary 95 is above (has a higher reflectance) than the upper closure boundary 90. The profiles in FIGS. 7 through 12 are "reverse scans" in that the left side of the profiles represents the stop character from the PDF417 symbology, while the right side the profile represents the start character. As a result, the symbol 102 is shown "upside down" in that it begins on the left with the stop character and ends on the right with the start character. The symbol 102 includes elements of many sizes, including 1-wide bars 62, 2-wide bars 64, 2-wide spaces 70, 1-wide spaces 69, a 7-wide bar 65, a 4-wide space 73, a 3-wide bar 66, and an 8-wide bar 67. Details on the PDF417 symbology are available to, and known by, those skilled in the art.

As shown in FIG. 7, the 2-wide bar 64, 3-wide bar 66, and larger bars such as the 7-wide bar 65 and the 8-wide bar 67 produce valleys 74, 76, 75 and 77, respectively, all which have less than 20% reflectance. The wide spaces (e.g., 2-wide space 70 and 4-wide space 73) all produce peaks having greater than 70% reflectance (e.g., peaks 80 and 83, respectively). The 1-wide bars 62 produce valleys 72 that just fall to about 40% reflectance. The 1-wide spaces 69 produce peaks 79 that just rise to about 54% reflectance. Importantly, all of the valleys in the profile of FIG. 7 are distinct from all of the peaks, and thus standard decoding circuitry such as thresholding circuitry could possibly locate the transitions from valleys to peaks in the profile in FIG. 7. By locating the transitions from valleys to peaks, standard decoding circuitry can identify the edges of each of the elements in the profile and thereby decode the profile.

The profile of FIG. 7, however, is a theoretical profile, and therefore lacks noise and other signal processing problems that make it difficult, if not impossible, for standard thresholding circuitry to identify transitions between peaks and valleys. Typical profiles are produced by apertures 61 having a size of 0.8X and produce profiles where the 1-wide bars 62 and 1-wide spaces 69 produce valleys and peaks having reflectances substantially similar to the valleys and peaks produced by the wide elements.

Figure 8:
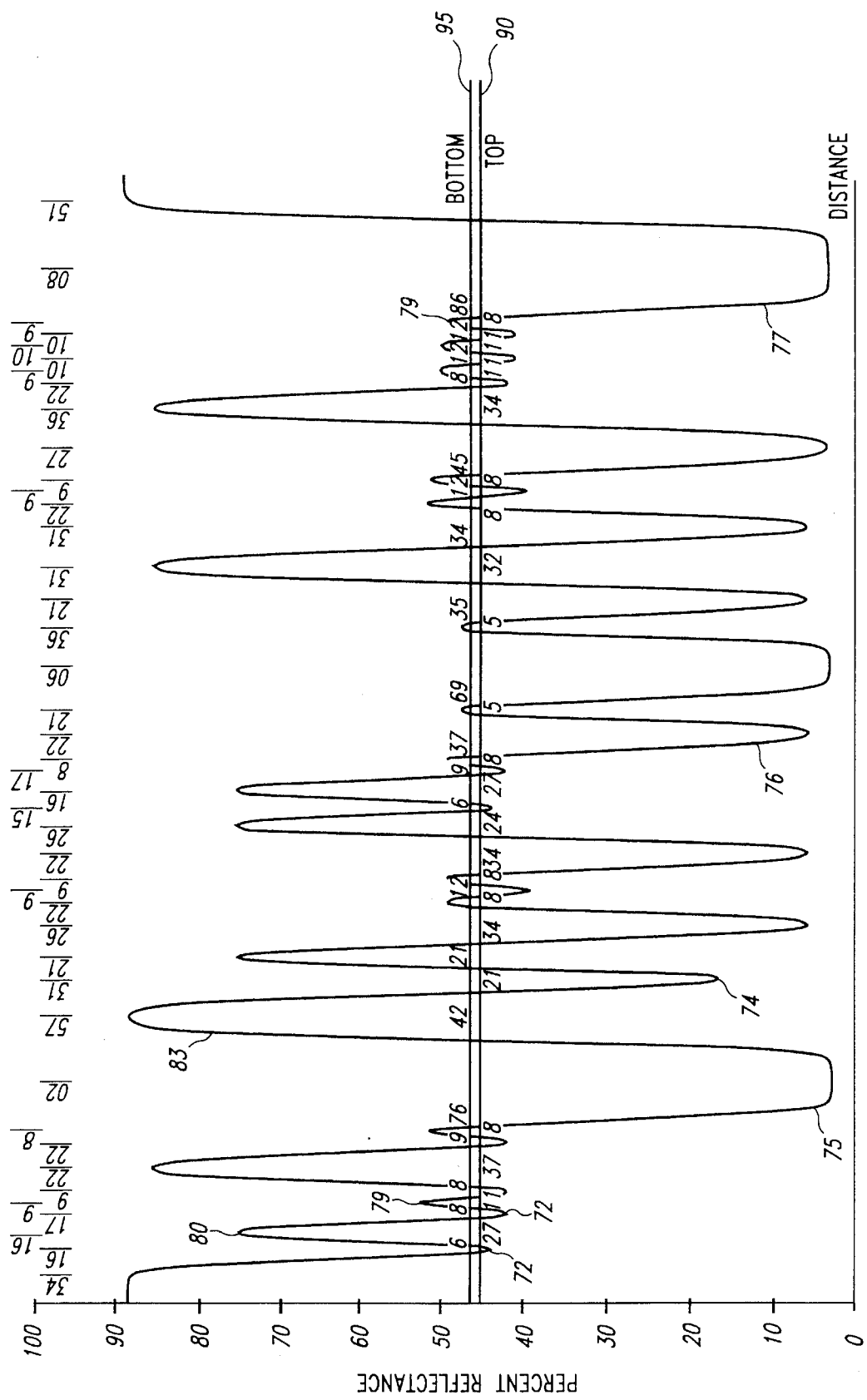
FIG. 8 is an example of a profile of the second row from the symbol of FIG. 6 produced by the reader of FIG. 1 having an aperture of 2.0 times the X-dimension of the symbol.
Figure 9:
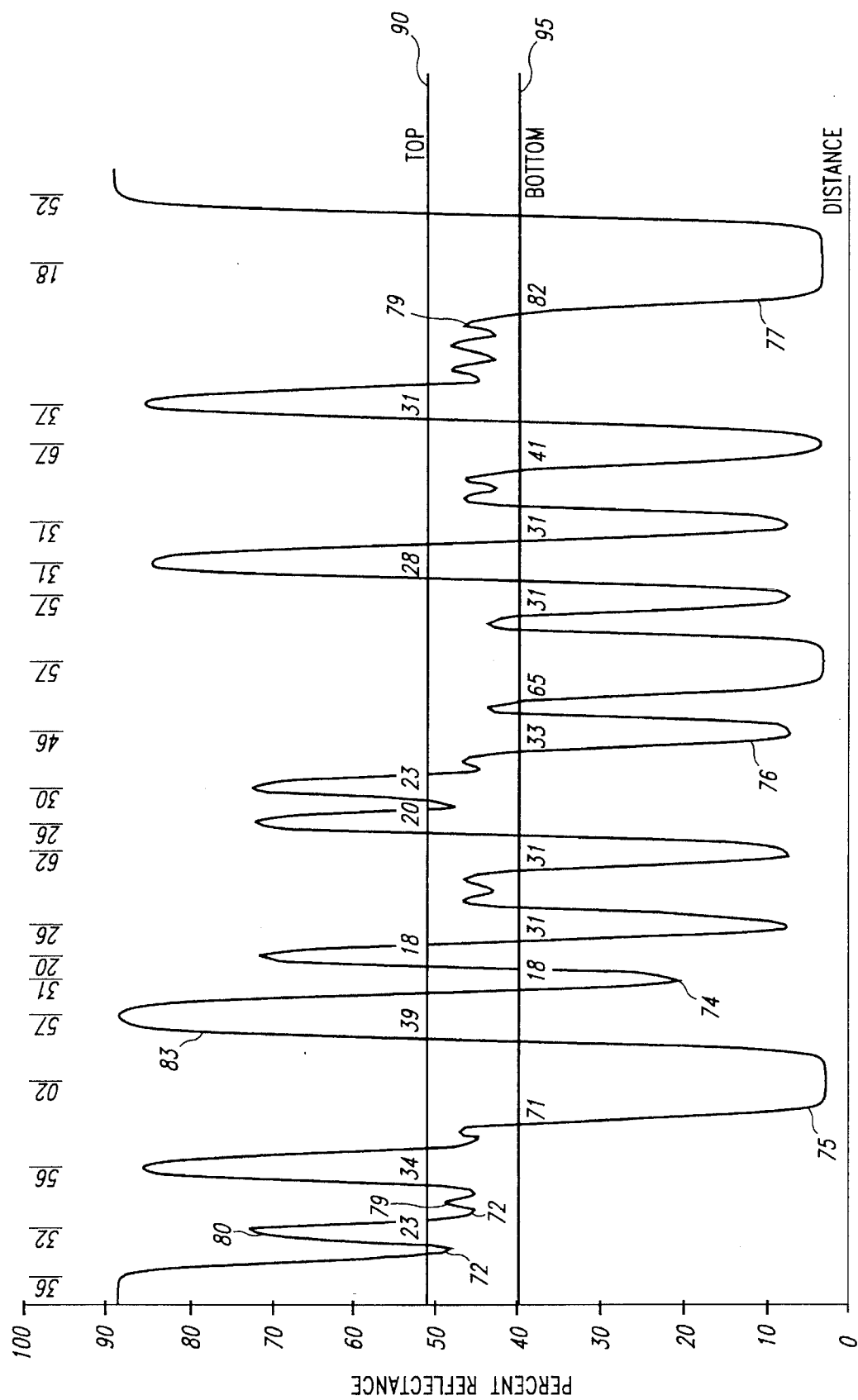
FIG. 9 is an example of a profile of the second row from the symbol of FIG. 6 produced by the reader of FIG. 1 having an aperture of 2.2 times the X-dimension of the symbol.
Figure 10:
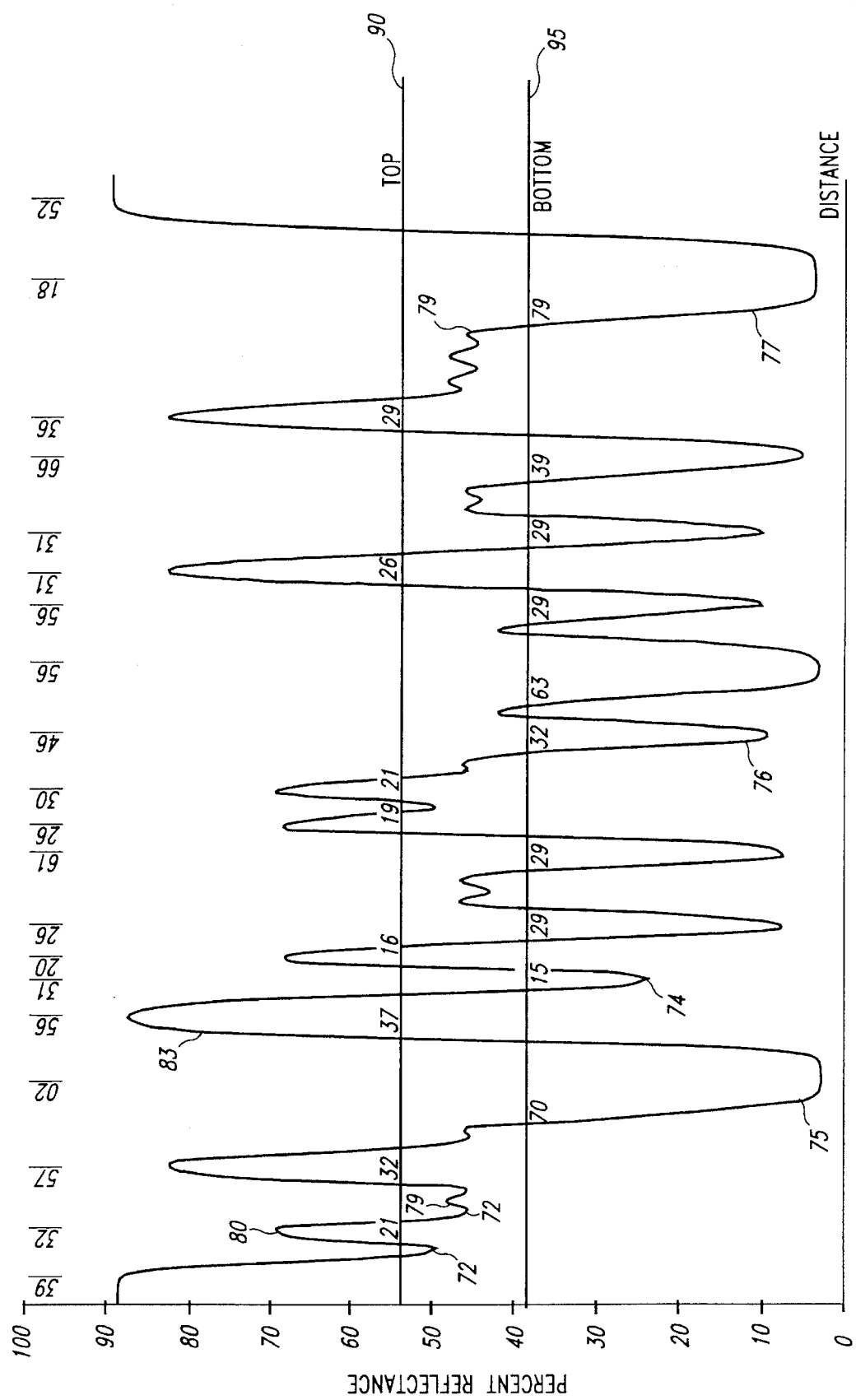
FIG. 10 is an example of a profile of the second row from the symbol of FIG. 6 produced by the reader of FIG. 1 having an aperture of 2.4 times the X-dimension of the symbol.
Figure 11:
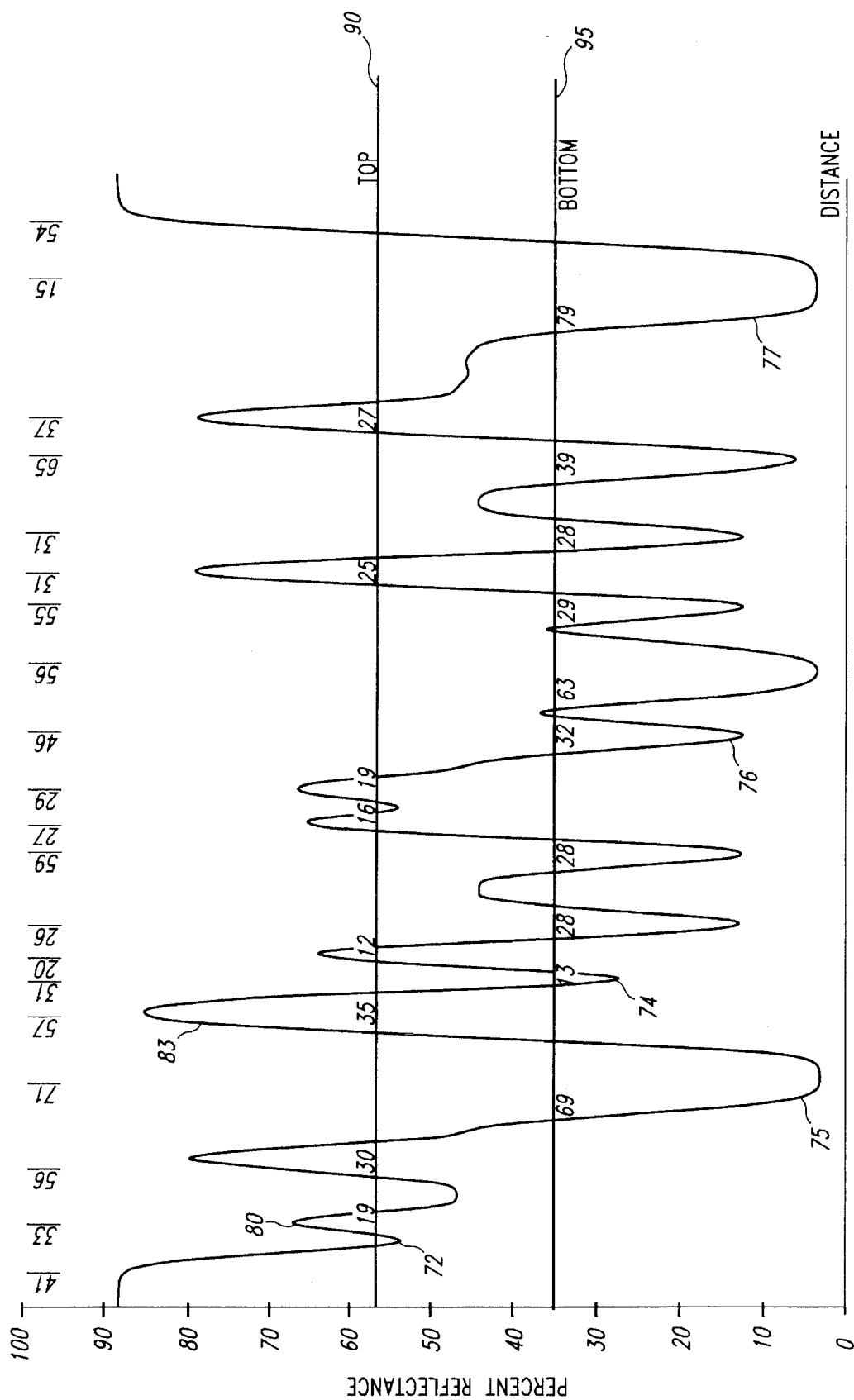
FIG. 11 is an example of a profile of the second row from the symbol of FIG. 6 produced by the reader of FIG. 1 having an aperture of 2.6 times the X-dimension of the symbol.
Figure 12:
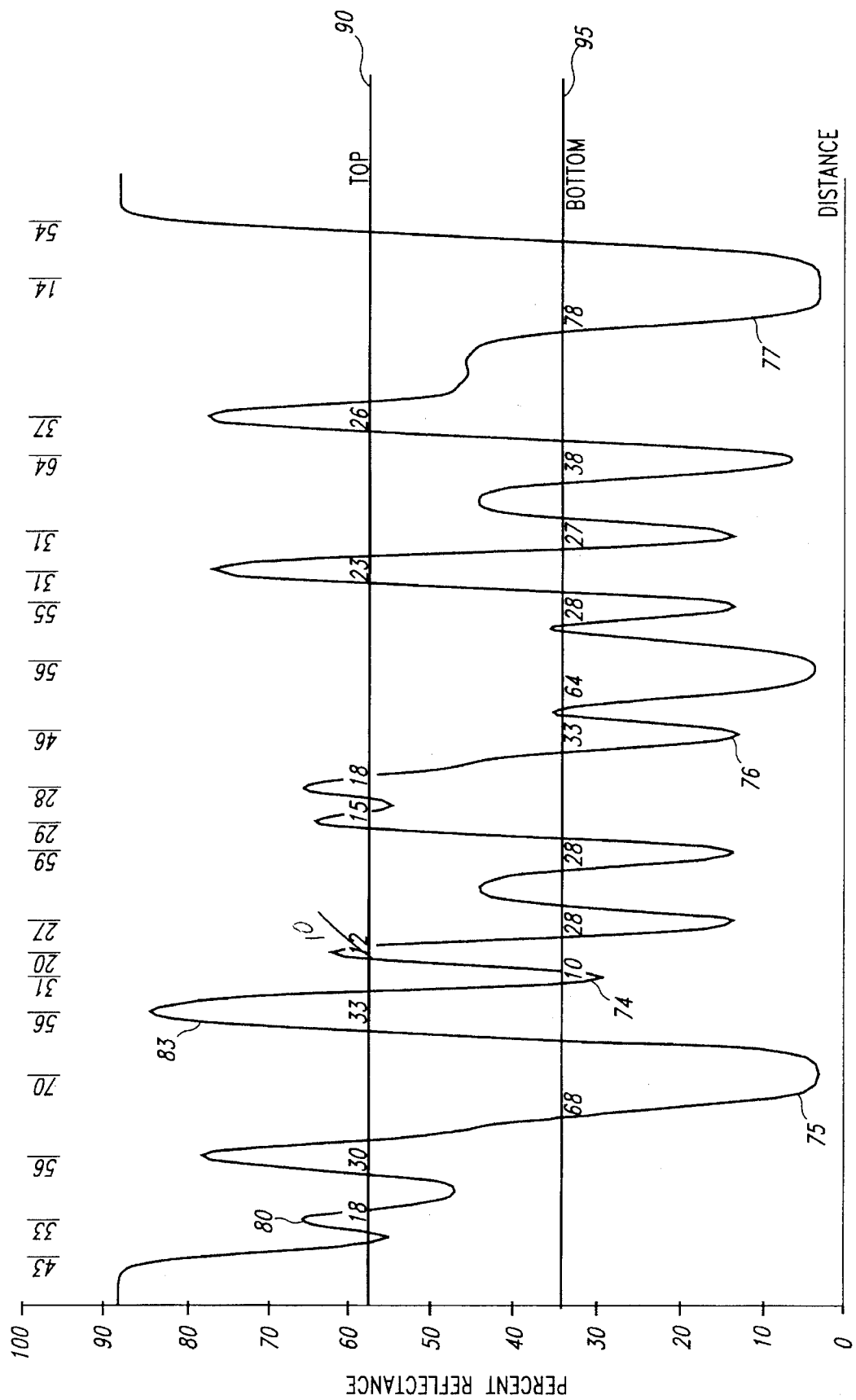
FIG. 12 is an example of a profile of the second row from the symbol of FIG. 6 produced by the reader of FIG. 1 having an aperture of 2.8 times the X-dimension of the symbol.

FIGS. 7 through 12 demonstrate that as the size of the aperture 61 in the reader 50 increases from 1.8X to 2.8X, and thus the second row from the symbol 53 becomes more out-of-focus, the 1-wide bars 62 and the 1-wide spaces 69 produce respective valleys 72 and peaks 79 of decreasing amplitude so that with an aperture 61 of about 2.4X, the profile shown in FIG. 10 just barely indicates the positions of these 1-wide elements. The profile of FIG. 10 is undecodable using standard decoding circuitry, and FIGS. 8 and 9 are likely undecodable using such circuits. The wide elements, e.g., the 2-wide, 3-wide and 7-wide bars 64, 66 and 65, and the 2-wide and 4-wide spaces 70 and 73, are still discernible and have significant contrast therebetween, e.g., valleys 74, 76 and 75, and peaks 80 and 83 in the profile of FIG. 10, all respectively. Importantly, the positions of all valleys and peaks for the wide elements effectively remain constant as the aperture 61 in the sensor 54 increases, as shown by comparing the center distances along the top in FIG. 7 to the distances in FIG. 12. In FIG. 12, as the aperture 61 increases to 2.8X, the amplitudes of, and thus the contrast between, the valleys 74 and the peaks 80 for the 2-wide bars 62 and spaces 70, respectively, tend to diminish as these 2-wide elements also become unresolved.

As is known, when the size of an aperture 61 increases, the depth-of-field decreases, so that if the size of an aperture doubles, the depth-of-field is reduced approximately in half. The profiles shown in FIGS. 7 through 12, therefore, cam also be used to demonstrate the profiles that would be produced by the sensor 54 having a fixed aperture 61 of 0.8X, but where the profiles are generated by the reader 50, from a slightly out-of-focus distance (FIG. 7) to a substantially out-of-focus distance of approximately twice as far (FIG. 12) for the symbol 102. Additionally, the profiles shown in FIGS. 7 through 12 may also be used to demonstrate an out-of-focus laser scanner or wand, or a CCD-type reader having too few pixels in its CCD array to adequately resolve a given image as explained below with respect to FIGS. 13, 15 and 16.

Figure 14A:
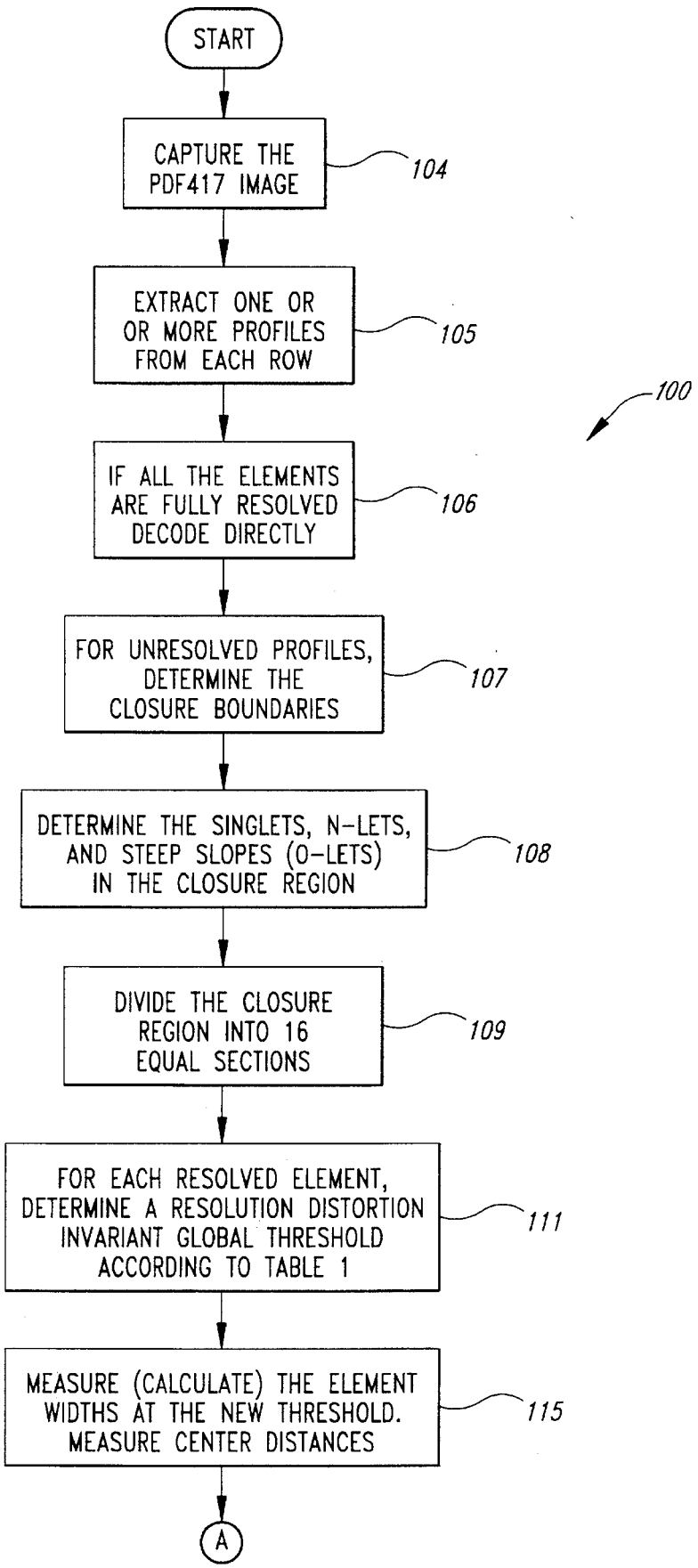
FIGS. 14A, 14B and 14C are flowcharts which together show an inventive method of decoding unresolved profiles used by the reader of FIG. 1.
Figure 14B:
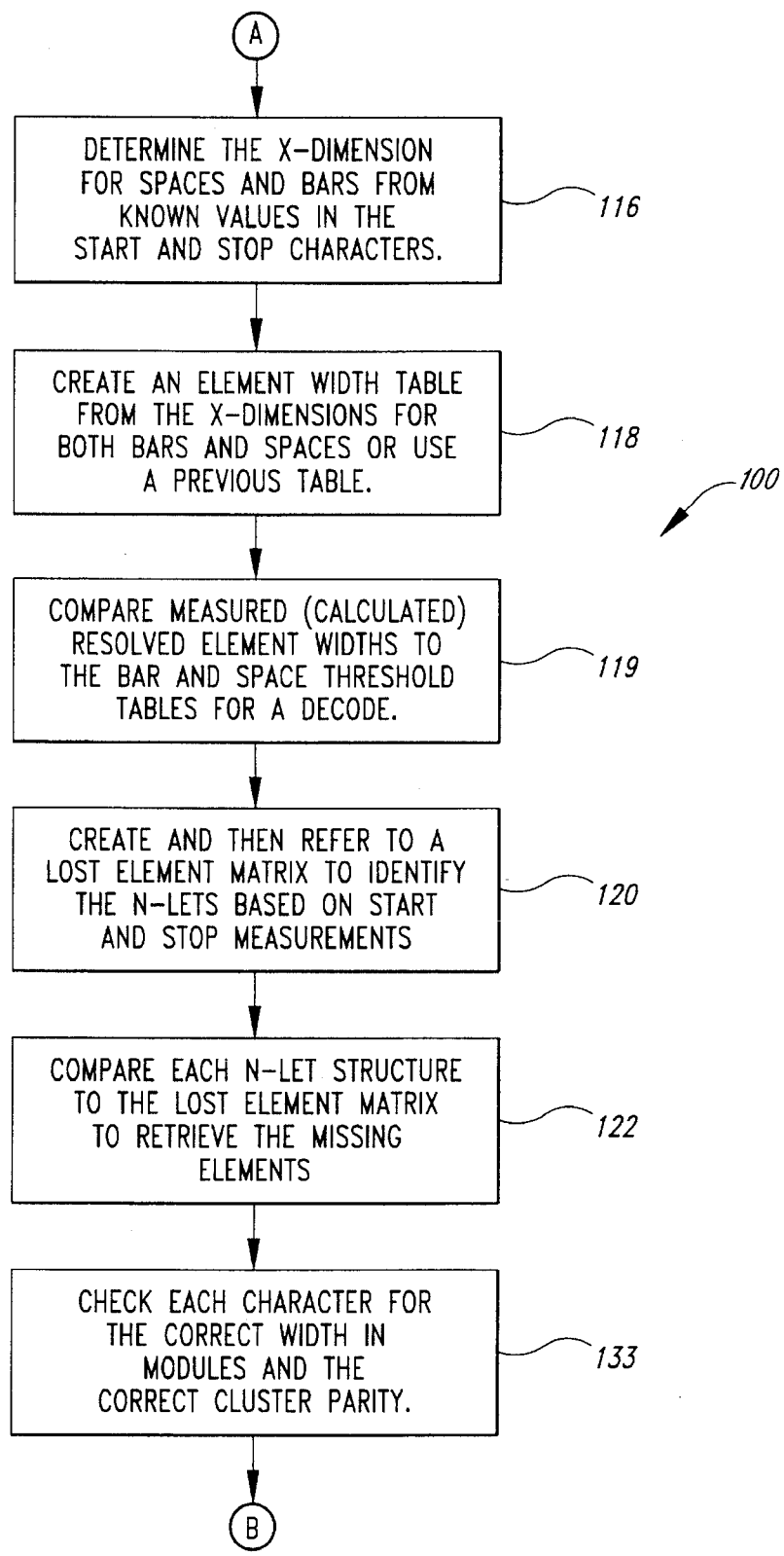
Figure 14C:
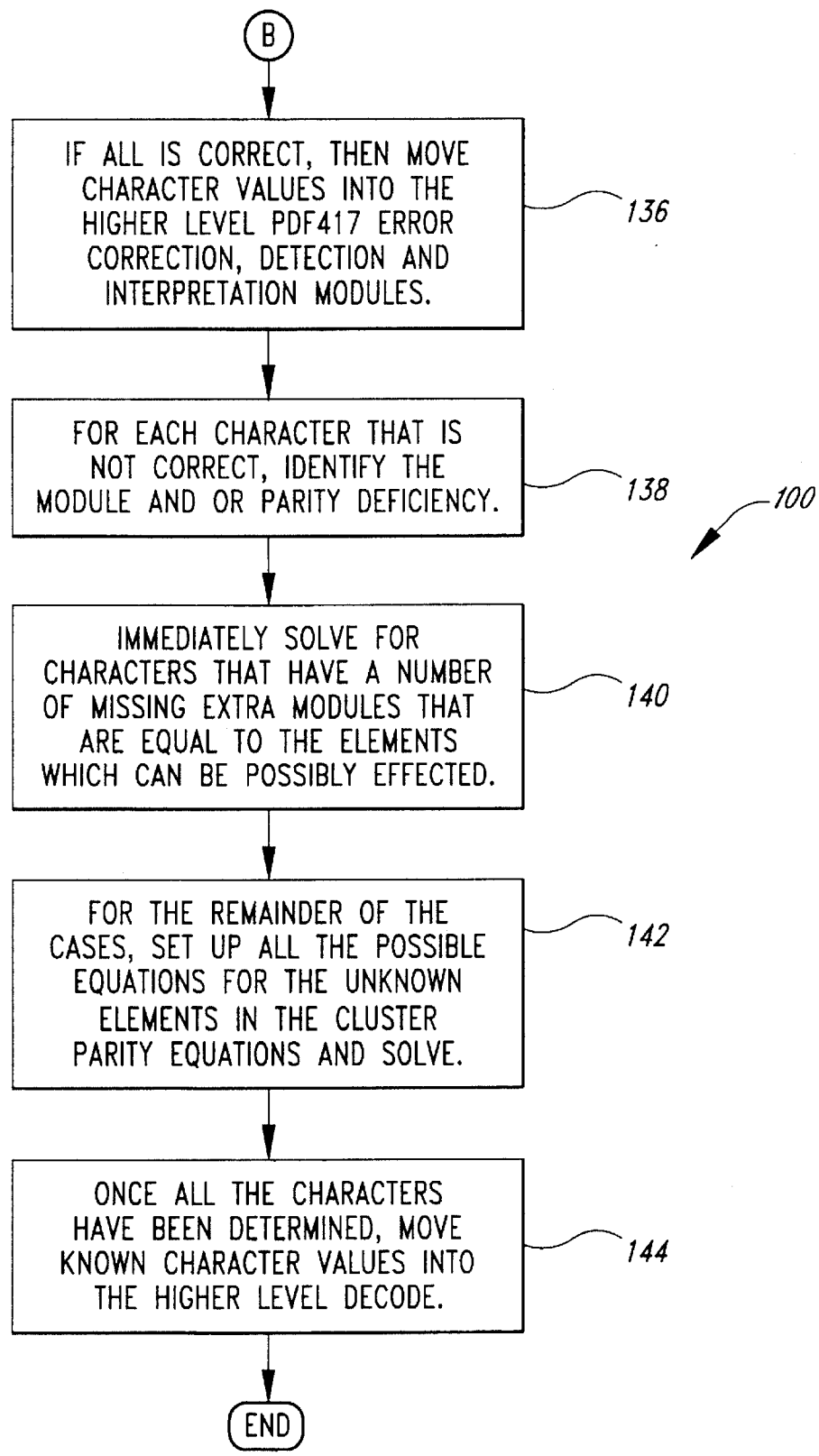

Referring now to FIGS. 14A, 14B and 14C, a routine 100 for decoding unresolved profiles utilizing the present invention begins in step 104 (FIGS. 14A) by scanning or imaging the symbol to capture its image. The routine 100, and all routines and methods described herein, are generally performed by the processor 60 and are permanently stored within the memory 57. In step 104, the processor 60 signals the light source 52 to provide light to a symbol. The sensor 54 receives the modulated light reflected from the symbol and produces an analog signal profile. In step 105, the converter 56 converts the analog signal to one or more multi-level digital signal profiles, which are then input to the processor 60. In step 106, the processor 60 determines if the profile is in-focus, i.e., all elements in the symbol are resolved, and if so, the processor decodes the profile.

If the profile exhibits closure, i.e., some elements in the symbol are unresolved, then in step 107, the processor 60 analyzes the profile to identify the higher peaks and lower valleys in the profile and determines closure boundaries. FIG. 13 shows a profile from the second row of the symbol 102, as produced by a two-dimension image sensor such as a CCD sensor 54. The profile of FIG. 13 shows the center distances between resolved elements along the top of the profile and the closure widths of the resolved elements as measured at the upper or lower closure boundaries 90 and 95.

The jaggedness in the profile is due to the fact that a finite number of pixels were used to image the second row of the symbol 102. Each "jag" is the result of plotting the reflectance value of one pixel. The net result, on a macroscopic scale, is the same as if the symbol were imaged with an infinite number of pixels with out-of-focus optics, such as with an aperture significantly larger than the X-dimension (as discussed above). Comparing the profile FIG. 13 to the profiles in FIGS. 7 through 12, the profile FIG. 13 is similar to the profile of FIG. 11, which was produced by an aperture 61 of 2.6X.

The second row of the symbol 102 contains 90 modules, while the CCD sensor 54 has 98 pixels. A "module" is the narrowest nominal width unit of measure in a bar code symbology. A module is therefore also generally equal to the X-dimension. The ratio of the number of pixels to modules can be referred to as the ratio beta. Since 98 pixels were used to image 90 modules in the profile of FIG. 13, the beta for the profile is equal to 1.1.

The unresolved 1-wide elements in the symbol 102 are represented, if at all, by ripples in the middle of the profile of FIG. 13, all within the closure region 110. Peaks or valley outside of the closure region. 110 correspond to resolved elements in the symbol 102, while any information in the profile within the closure region 110 is unreliable (i.e., undetectable or indistinguishable from noise or priming errors). Under the routine 100, the processor 60 must begin to decode a closure profile by determining which elements are resolved in the profile. Therefore, in step 107, the processor 60 examines the profile of FIG. 13 to determine how often the profile reaches or crosses each of a series of reflectance thresholds between 0% and 100% reflectance.

In step 107, the processor 60 repeatedly examines the profile by first determining how often the profile crosses an initial preselected percent reflectance threshold of 0%. The processor 60 then increases the percent reflectance threshold by 1% and determines how often the profile crosses this threshold. Thereafter, the processor 60 again increases the threshold by 1% (to 2%), determines how often the profile crosses the new percent reflectance threshold, and continues in this manner up to 100% reflectance. The profile is retained in the memory 57 as a string of reflectance level values, and therefore, it may be analyzed repeatedly. To visualize the process, the processor 60, under the routine 100, in essence draws equally spaced horizontal lines across the profile in FIG. 13, for example, at 1% reflectance intervals, and then determines how often the profile crosses a given reflectance threshold.

The processor 60 examines the number of times the profile crosses given reflectance values to locate upper and lower reflectance regions and establish upper and lower closure thresholds or boundaries 90 and 95, respectively. The processor 60 establishes the upper closure boundary 90 within a range of reflectance values exceeded by most of the peaks in the profile. Similarly, the processor 60 establishes the lower closure boundary 95 within a range of reflectance values exceeded by most of the valleys. Alternatively, the processor 60 can examine the profile, locate the highest valley, and establish the upper closure boundary 90 at the reflectance value of the highest valley in the profile. The processor 60 then similarly locates the lowest peak in the profile, and establishes the lower closure boundary 95 as the reflectance value of the lowest peak. In step 107, the processor 60 also identifies the resolved wide elements, i.e., 2-wide through 8-wide spaces and bars as the peaks and valleys in the profile that extend beyond the upper and lower closure boundaries 90 and 95. Methods and apparatus for establishing the upper and lower closure boundaries 90 and 95, respectively, and identifying which elements are resolved, are discussed more thoroughly in the inventor's U.S. patent application Ser. No. 08/327,972, filed Oct. 24, 1994. Those skilled in the art, however, will recognize that any technique for determining which elements are resolved in a given profile so as to extract or filter out the reliable information from the profile can be used in step 107 of the present invention.

The inventor has found, by analyzing unresolved profiles such as those in FIGS. 3, 5 and 7 through 12, that resolved elements are distorted by their neighboring or bordering elements, and that such distortions can be grouped into a reduced set of environments. If a resolved element in question is adjacent to another resolved element, then the adjacent resolved element has the same effect on the resolved element in question, regardless of its size. Therefore, all resolved elements, from two to eight modules wide, adjacent to a given resolved element can be thought of as simply a 2-wide element for purposes of determining the distorting effect that the resolved element has on the given resolved element. For example, if a given 2-wide element is bordered by a 3-wide element on one side and a 4-wide element on the other, the 2-wide element can simply be considered as being bordered by 2-wide elements on both sides.

If a given resolved element is adjacent to unresolved elements (i.e., one or more 1-wide elements), then the adjacent 1-wide elements fall into one of two categories: (i) single 1-wide elements or singlets, and (ii) more than singlets, such as doublets, triplets, and so on. All "n-lets" greater than 1 affect an adjacent resolved element in the same way, so that such n-lets may be referred to as doublets for simplicity. Consequently, a given resolved element can be adjacent to one of three possible environments: singlets, doublets or 2-wides.

By determining the environment surrounding a given resolved element, the present invention can determine the distorting effects of such environment on the resolved element. As explained above, the environment surrounding a given resolved element distorts the element so that its width, as measured at the upper or lower closure boundary 90 or 95, varies depending upon the environment. The three environments affect all resolved elements in a predictable fashion. Therefore, the present invention can use the information of the environment surrounding a resolved element to determine a location at which to measure the width of the element, rather than measuring the width of that element at the upper or lower closure boundaries 90 or 95. Based on the knowledge that a given environment distorts a resolved element in predictable ways, the present invention can establish locations at which to measure the width of result elements, which can be globally applied to a given profile and which are independent of the amount or type of distortion overall affecting a given symbol. Preferably, the present invention establishes a series of thresholds within the closure region 110 between the upper and lower closure boundaries 90 and 95 at which to measure the width of a given resolved element based on the element's environment.

Through analysis of profiles, such as the profiles of FIGS. 3, 5 and 7 through 12, the inventor has found that the amount of distortion affecting a given resolved element based on its environment correlates by factors of two with respect to the type of environment. As a result, four quantized thresholds from the upper closure boundary 90 can be used at which to measure the widths of resolved spaces: one-half the distance from the upper closure boundary 90 to the lower closure boundary 95, one-quarter of that distance, one-eighth of that distance, and one-sixteenth of that distance. These four thresholds are shown in dashed lines in FIG. 15 and are referred to by reference numerals 170, 174, 178, and 180, respectively. Similarly, four thresholds from the lower closure boundary 95 can be used at which to measure the widths of resolved bars: one-half the distance from lower closure boundary 95 to the upper closure boundary 90, one-quarter of that distance, one-eighth of that distance, and one-sixteenth of that distance. These four thresholds are shown in dashed lines in FIG. 15 and are referred to by reference numerals 170, 173, 177, and 179, respectively.

Wide elements bordering a given resolved element tend to distort the given resolved element more than narrow elements adjacent to the given resolved element. Therefore, when a given resolved element is bordered by wide elements on both sides, the width of the given resolved element is to be measured at one-half the distance between the upper and lower closure boundaries 90 and 95 (i.e., at threshold 170). Conversely, if a given resolved element is bordered by singlets on both sides, the singlets do not significantly distort the given resolved element, and thus, the width of the given resolved element is to be measured at the upper closure boundary 90 (for spaces) or lower closure boundary 95 (for bars). Table 1 below indicates at which threshold the width of a given element is to be measured based on the environment of that element.

TABLE 1

APPROPRIATE THRESHOLD FOR MEASURING WIDTH OF RESOLVED ELEMENT BASED ON ITS ENVIRONMENT

| Environment Surrounding Resolved Element | Location of Threshold as Compared to Distance from Upper or Lower Closure Boundary to Lower or Upper Closure Boundary, for Resolved Space or Bars, All Respectively |
|---|---|
| 2-wide/2-wide | ½ (threshold 170) |
| 2-wide/doublet | ¼ (threshold 173 or 174) |
| 2-wide/singlet and doublet/doublet | ⅛ (threshold 177 or 178) |
| singlet/doublet | 1/16 (threshold 179 or 180) |
| singlet/singlet | 0 (at the upper or lower closure boundary 90 or 95) |

Table 1 thus indicates that for any given resolved space (i.e., an element having a size of 2- wide or greater), if its adjacent elements are a 2- wide or greater bar on one side and a doublet (two 1-wide elements) on the other, then the width of the resolved element is to be measured at a threshold one-quarter of the distance form the upper closure boundary 90 to the lower closure boundary 95 i.e., at threshold 174. Similarly, for any resolved bar, if its environment consists of singlets on each side (i.e., bounded by adjacent 1-wide spaces), then the width of the resolved bar is to be measured at the lower closure boundary 95. Overall, the quantized thresholds are at distances between the upper and lower closure boundaries 90 and 95 defined by the equation $½^n$ where n equals 0,1,2,3 and 4.

Referring back to FIG. 14A, the processor 60 in step 108 determines the environment surrounding all resolved elements. The processor 60 determines whether a given resolved element is bounded by 2-wides, doublets or singlets by examining the profile surrounding the resolved element. For example, the processor 60 analyzes the slope of the profile proximate to each resolved element.

The processor 60 determines that a given resolved element is bounded by a singlet if the profile contains a steep sloped spike or valley adjacent to the resolved element. The processor 60 distinguishes singlets from triplets or other n-lets by analyzing the profile produced by the stop pattern for the symbol 102. Since the symbol 102 is a PDF417 symbol, its stop pattern consists of a quiet zone followed in turn by a 1-wide bar 62, a 2-wide space 70, a 1-wide bar, a 1-wide space 69, a 1-wide bar and a 3-wide space 71. The "quiet zone" is a space lacking any marks that precedes the start character of a symbol and follows the stop character. As shown in FIG. 13, the 1-wide bar 62 between the quiet zone and the 2-wide space 70 produces the steep sloped valley 72, while the triplet between the 2-wide space 70 and the 3-wide space 71 produces a less steep slope valley 99 having a discontinuous or flattened bottom.

The processor 60 identifies doublets adjacent to a resolved element as having a discontinuous or less steep slope when compared to resolved elements immediately adjacent to each other which contain no (zero) 1-wide elements therebetween. In FIG. 13, the valley 75 and the peak to the left of the valley (corresponding to the 7-wide bar 65 and the 3-wide space 71, respectively) enclose a doublet therebetween. Those skilled in the art will recognize that other techniques for determining the environment surrounding each resolved element can be used in step 108 of the present invention.

In step 109, the processor 60 divides the closure region 110 into sixteen equal lines, section or thresholds between the upper and lower closure boundaries 90 and 95. The sixteen thresholds permit the processor 60 to readily establish the seven thresholds 170, 173, 174, and 177 through 180 between the upper and lower closure boundaries 90 and 95. The processor 60 need not establish the sixteen thresholds in step 109, but instead, establish only the seven thresholds 170, 173, 174, and 177 through 180. In step 111, the processor 60 analyzes the slope of the profile to the left and right of each resolved element and determines the appropriate quantitized threshold at which to measure the width of the resolved element, using Table 1. The processor 60 then, in step 115, measures the width of the resolved element at the appropriate threshold.

Figure 15:
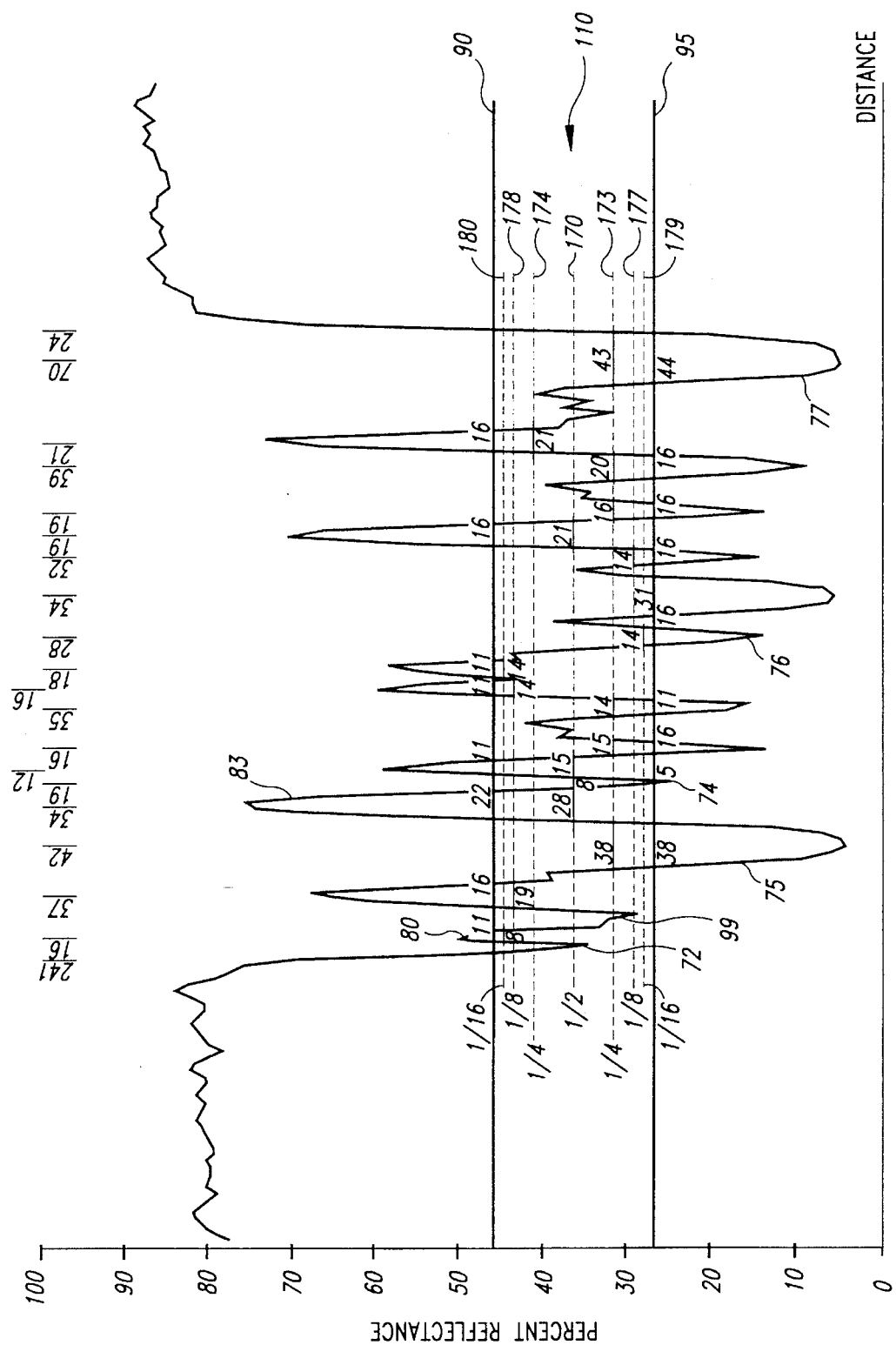
FIG. 15 shows an enlargement of the profile of FIG. 13 with several intermediate closure thresholds, and the measured widths of resolved elements at selected intermediate thresholds, indicated with respect to the profile.

FIG. 15 shows the profile of FIG. 13 with the quantized thresholds 170, 173, 174, 177, 178, 179, and 180 between the upper and lower closure boundaries 90 and 95. FIG. 15 also shows lines through resolved elements at the appropriate thresholds at which the widths of a given resolved element is to be measured and associated numbers indicating the measured width. For example, under the routine 100, the processor 60 in step 111 determines that the first peak 80 is bounded on the left by a singlet and on the right by a doublet. Under Table 1, the appropriate threshold, for a resolved space, is the threshold 180 located 1/16 of the distance downward from the upper closure boundary 90 to the lower closure boundary 95. In step 115, the processor 60 measures the peak 80 at the threshold 180 and determines that the peak has a width of 8(as compared to the width of 11 measured at the upper closure boundary 90).

In step 111, the processor 60 determines that the first resolved valley 75 is bounded on the left by a doublet and on the right by a 2-wide (actually, a 4-wide space). Under Table 1, the appropriate threshold, for a resolved bar, is the threshold 173 located ¼ of the distance upward from the lower closure boundary 95 to the upper closure boundary 90. In step 115, the processor 60 measures the alley 75 at the threshold 173 and determines that the valley has a width of 38. Overall, the processor 60 in step 115 measures and stores the widths of all resolved elements as measured at the appropriate threshold based on Table 1.

In step 115, the processor 60 also locates the centers of the resolved peaks and valleys in the profile, and then measures and stores the distances between the centers. The processor 60 locates the center of each peak and valley in the profile by first locating the two points at which a given peak or valley crosses the upper or lower closure boundary 90 and 95, respectively, and then locating a center point along that boundary which is halfway between the two points. The processor 60 determines the distances between the centers of identified peaks and valleys, or "center distances," based on the positions of the identified peaks and valleys with respect to an imaginary axis normal to the peaks and valleys (e.g., a line of y=100% reflectance for the profile of FIG. 15). Alternatively, the processor 60 can locate the centers of each peak and valley in the profile by determining the position of the highest or lowest point for a given peak or valley, respectively. Determining the position of the highest/lowest point can be performed using known methods, such as locating the points at which the slope of the profile changes sign (e.g., from positive to negative), or when the amplitude changes from an increasing value to a decreasing value, or vice versa. With any method, the processor 60 can locate the centers of the resolved elements in the profile despite the presence of printing defects in a symbol such as spots or voids, heavy or light ink spread, low contrast, or other noise, and is thus immune to poor print quality.

After measuring and storing the distances between the resolved elements and the widths of these elements in the profile, all reliable data has been extracted from the profile. Therefore, the processor 60 no longer needs the stored digital profile and the portion of the memory 57 which stored this profile can be used for other purposes, such as storing a profile from the next symbol read by the reader 50.

In steps 116 and 118, the processor 60 determines an estimated width of the resolved elements for 2-wide through n-wide elements. For PDF417 symbols, the largest space is 6-wide, while the largest bar is 8-wide. Because of printing defects, the resolved spaces are often wider than the resolved bars, or vice versa. Therefore, the measured widths of the resolved bars are often unequal to the measured widths of the resolved spaces in a profile for a given element width (e.g., a measured width of a 2-wide space is often unequal to the measured width of a 2-wide bar). Additionally, if the widths of the resolved spaces are measured at the upper closure boundary 90 and the widths of the resolved bars are measured at the lower closure boundary 95, the measured widths vary depending upon where the upper an lower closure boundaries are selected for a particular profile.

If ink spread is near zero, then the width of all 2-wide elements in the symbol 102 are identical (e.g., 2-wide bars of the same width as 2-wide spaces). As a result, the width of resolved elements, as measured at the appropriate thresholds, could then be used to identify which resolved elements are 2-wide, 3-wide, 4-wide and so on. The present invention, however, preferably uses a more robust method that separates resolved elements by type (bar vs. space) and decodes then independently, thereby providing an ink spread invariant method. Such a method of the decoding bars independently of spaces is known in the art, such as the reference decode algorithm in the Codabar symbology. The processor 60, in step 116 of FIG. 14B, determines an X-dimension for the spaces and an X-dimension for the bars from the known values in the profile. The X-dimension for the PDF417 symbology, and most symbologies, corresponds to the width of the 1-wide elements. For example, the processor 60 can determine that the symbol 102 is a PDF417 symbol by analyzing the profile and locating the two large valleys 75 and 77 at opposite ends of the profile, which represent the 7-wide and 8-wide bars in the stop and start characters, respectively, for the PDF417 symbology. Having identified that the profile is from a PDF417 symbol, the processor 60 can recognize that the large resolved peaks adjacent to the large valleys correspond to two 3-wide spaces.

Having measured the element widths in step 115, the processor 60 in step 116 averages the two 3-wide widths of the spaces and divides by three to obtain an estimate of the X-dimension for all spaces. As shown in FIG. 15, the two resolved peaks to the left of the large valleys 75 and 77 have measured widths of 19 and 21, respectively, (at the thresholds 178 and 174, respectively) which corresponds to an X-dimension of 6.67 (i.e., ((19+21)/2)/3=6.67). From the estimated X-dimension, the processor 60 in step 118 generates an estimated width of all resolved spaces, so that, for example, any resolved space less than 2.5 times the X-dimension (2×6.67) is a 2-wide space, any resolved space between this value and 3.5 times the X-dimension is a 3-wide space, and so on, as shown in the following table. Exemplary values based on the calculated X-dimension of 6.67 are shown below in brackets.

TABLE 2

ESTIMATED RESOLVED SPACE WIDTHS

| Lower Width Limit | Estimated Resolved Space | Upper Width Limit |
|---|---|---|
| | 2-wide | ≦2.5 (X-dimension) [16.7] |
| 2.5 (X-dimension) [16.7]< | 3-wide | ≦3.5 (X-dimension) [23.3] |
| 3.5 (X-dimension) [23.3]< | 4-wide | ≦4.5 (X-dimension) [30.0] |
| 4.5 (X-dimension) [30.0]< | 5-wide | ≦5.5 (X-dimension) [36.7] |
| 5.5 (X-dimension) [36.7]< | 6-wide | |

Similarly, an estimated X-dimension for the resolved bars can be derived from the widths of the large valleys 75 and 77 for the 7-wide and 8-wide bars, respectively (at the threshold 173). As shown in FIG. 15, the 7-wide and 8-wide bars have measured widths of 30 and 43, respectively, which in step 116 results in an estimated X-dimension for the bars of 5.4 (i.e., (38+43)/15=5.4). The processor 60 can then, in step 118, construct an estimated resolved bar width table, similar to Table 2, as shown in Table 3 below. Exemplary values based on the calculated X-dimension of 5.4 are shown in brackets in Table 3.

TABLE 3

ESTIMATED RESOLVED BAR WIDTHS

| Lower Width Limit | Estimated Resolved Space | Upper Width Limit |
|---|---|---|
| | 2-wide | ≦2.5 (X-dimension) [13.5] |
| 2.5 (X-dimension) [13.5]< | 3-wide | ≦3.5 (X-dimension) [18.9] |
| 3.5 (X-dimension) [18.9]< | 4-wide | ≦4.5 (X-dimension) [24.3] |
| 4.5 (X-dimension) [24.3]< | 5-wide | ≦5.5 (X-dimension) [29.7] |
| 5.5 (X-dimension) [29.7]< | 6-wide | ≦5.5 (X-dimension) [35.1] |
| 6.5 (X-dimension) [35.1]< | 7-wide | ≦5.5 (X-dimension) [40.5] |
| 7.5 (X-dimension) [40.5]< | 8-wide | |

Alternatively, in step 116, the processor 60 can determine the X-dimension based on the smallest center distance values measured from the profile. The smallest center distance generally corresponds to a 2-wide bar next to a 2-wide space, and is referred to herein as the "STD." The distance between the center of a valley defining the 2-wide bar and the center of the peak defining the 2-wide space will necessarily include two elements (i.e., one-half of a 2-wide bar and one-half of a 2-wide space, or 1 element+1element=2 elements). Therefore, dividing the STD by two provides the X-dimension.

In the profile of FIG. 15, the STD is 12. Consequently, dividing this STD by 2 provides an X-dimension of 6. To obtain a more accurate X-dimension, the processor 60 can average the smallest center distances to produce the X-dimenison. While the following discussion used an STD of 12 and a X-dimension of 6, the routine 100 need not round off these and other measurements discussed herein if the computed result is not a whole number. Those skilled in the art will recognize that any technique for estimating the size of the X-dimension and the size of larger element widths for the bars and/or spaces can be used in steps 116 and 118 of the present invention.

In step 119, the processor 60 compares the widths measured in step 115 to Table 2 (for spaces) or Table 3 (for bars) to identify the size of a given resolved element. As shown in FIG. 16, the first resolved peak 80, a space, has a measured width of 8. Referring to Table 2, the measured width of 8 is less than 16.7 and therefore the peak 80 corresponds to a 2-wide space. The first valley in the profile, a bar, has a measured width of 38. Referring to Table 3, the processor 60 recognizes that the measured width of 38 is less than 40.5, but greater than 35.1. Therefore, according to Table 3, the processor 60 in step 119 determines that the first valley 75 corresponds to a 7-wide bar. FIG. 16 shows the size of the resolved spaces with the corresponding peaks, and the size of resolved wide bars with the corresponding valleys.

In step 120, the processor 60 creates a table, array or "lost element matrix" that is a key to completing the decode of the profile of FIG. 16. The lost element matrix estimates the various distances between resolved element pairs, and therefrom determines the number of 1-wide elements unresolved or "lost" between the resolved elements. The lost element matrix can be created because of the following three properties common in all fixed multi-width symbologies such as PDF417: (1) if a resolved space immediately follows a resolved bar, then zero 1-wide elements are lost therebetween; (2) if a resolved bar follows a resolved space or vice versa, then only an even number of 1-wide elements are present therebetween; and (3) if two like resolved elements (e.g., two 3-wide bars) are adjacent in a given profile, then only an odd number of 1-wide elements are present therebetween. As used generally herein, "opposite resolved elements" refers to 2-wide or greater bars and 2-wide or greater spaces next to each other in a given profile, while "adjacent resolved elements" refers to two 2-wide or greater bars or two 2-wide or greater spaces next to each other in the profile. The terms "opposite" and "adjacent" refer to an element's "parity" or the element's location in the reflectance profile so that "adjacent elements" each have similar reflectance values while "opposite elements" each have very different reflectance values. Elements having opposite parity always have an even number of 1-wide elements lost therebetween while elements having adjacent parity always have an odd number of 1-wide elements lost therebetween.

For the PDF417 symbology, the distances between the centers of resolved elements in closure profiles are based on ten possible arrangements for resolved element pairs: a 2-wide element next to another 2-wide element (referred to herein as a "2—2" situation), a 2-wide element next to a 3-wide element (a "2–3" situation), a 2-wide element next to a 4-wide element (a "2–4" situation), a 3-wide element next to a 4-wide element (a "3–4" situation), a 4-wide element next to another 4-wide element (a "4—4" situation), a 4-wide element next to a 5-wide element (a "4–5" situation), a 5-wide element next to another 5-wide element (a "5—5" situation), a 5-wide element next to a 6-wide element (a "5–6" situation), a 6-wide element next to another 6-wide element (a "6—6" situation), and a 6-wide element next to the 7-wide stop bar (a "6–7" situation). Each element pair situation can have from zero to ten (a maximum in the PDF417 symbology) 1-wide elements lost therebetween. The remaining resolved element pair combinations have the same center distance as the above ten arrangements. For example, a 3-wide element next to a 3-wide element (a "3—3" situation) has the same center distance as the 2–4 distance (and the same number of total elements) for a given number of unresolved elements therebetween. Therefore, the 3—3 and 2–4 distances can contain the same number of 1-wide elements lost depending upon the center distance therebetween. Similarly, a 5-wide element next to a 2-wide element (a "2–5" situation) has the same center distance as the 3–4 distance for a given number of unresolved elements therebetween. Therefore, the 2–5 and 3–4 distances can contain the same number of 1-wide elements lost, depending upon the center distance therebetween. (The Code 49 symbology has seven possible arrangements.) An example of a template for a lost element matrix, which can be used and completed as described below for all multi-width symbologies, is shown in Table 4 below.

TABLE 4

LOST ELEMENT MATRIX

Estimated Distance Between Centers of Resolved Element Pairs

| Number of Lost Elements | Lost Element Parity | 2–2 | 2–3 | 2–4 3–3 | 2–5 3–4 | 2–6 3–5 4–4 | 2–7 3–6 4–5 | 3–7 4–6 5–5 | 4–7 3–8 5–6 | 5–7 6–6 | 6–7 |
|---|---|---|---|---|---|---|---|---|---|---|---|
| 0 | (Opposite) | | | | | | | | | | |
| 1 | (Adjacent) | | | | | | | | | | |
| 2 | (Opposite) | | | | | | | | | | |
| 3 | (Adjacent) | | | | | | | | | | |
| 4 | (Opposite) | | | | | | | | | | |
| 5 | (Adjacent) | | | | | | | | | | |
| 6 | (Opposite) | | | | | | | | | | |
| 7 | (Adjacent) | | | | | | | | | | |
| 8 | (Opposite) | | | | | | | | | | |
| 9 | (Adjacent) | | | | | | | | | | |
| 10 | (Opposite) | | | | | | | | | | |

Since the centers of resolved element pairs must be separated by zero or a discrete number of 1-wide elements, the processor 60, in step 120, can fill in the lost element matrix using various methods. As explained in U.S. patent application Ser. No. 08/327,972, filed Oct. 24, 1994, the lost element matrix can be filled in using the X-dimension and the STD. The smallest distance between two opposite 2-wide elements is equal to the average shortest distance for the profile or STD, which corresponds to a 2-wide bar immediately next to a 2-wide space with no 1-wide elements therebetween. The next largest distance in the 2—2 situation corresponds to one 1-wide element lost therebetween which can only occur between two resolved spaces or two resolved bars. Therefore, the next entry in the 2—2 column corresponds to the STD plus the X-dimension. The next largest distance in the 2—2 situation corresponds to two 1-wide lost elements or STD+(2×X-dimension), which corresponds to a resolved bar following a resolved space, or visa versa. For the 2–3 situation, the smallest distance between a 2-wide element immediately next to a 3-wide element corresponds to the STD plus one-half the X-dimension. The next largest distance for the 2–3 situation corresponds to the STD+(1.5× the X-dimension), and so forth.

Table 5 below shows the lost element matrix that includes the equations for determining the estimated center distance for resolved element pairs in using the X-dimension and STD.

remaining element pairs as it solves the equations in Table 5 for the calculated STD and X-dimension.

Alternatively, the processor 60 can begin filling in the lost element matrix using known values in the profile and then work backwards. The processor 60, having previously identified the symbol 102 as being a PDF417 symbol, knows that the first two peaks correspond to the distance between a

TABLE 5

LOST ELEMENT MATRIX USING STD AND X-DIMENSION
Estimated Distance Between Centers of Resolved Element Pairs

| Number of Lost Elements | Lost Element Parity | 2–2 | 2–3 | 2–4<br>3–3 | 2–5<br>3–4 | 2–6<br>3–5<br>4–4 | 2–7<br>3–6<br>4–5 | |
|---|---|---|---|---|---|---|---|---|
| 0 | (Opposite) | STD | STD + (0.5 × X-dimension) | STD + X-dimension | STD + 1.5 × X-dimension | STD = (2 × X-dimension) | ... | |
| 1 | (Adjacent) | STD + X-dimension | STD + (1.5 × X-dimension) | STD + (3 × X-dimension) | STD + (2 × X-dimension) | STD + 3 × X-dimension | ... | |
| 2 | (Opposite) | STD + (2 × X-dimension) | STD + (2.5 × X-dimension) | STD + (2.5 × X-dimension) | STD + (3 × X-dimension) | STD + (4 × X-dimension | ... | |
| 3 | (Adjacent) | STD + (3 × X-dimension) | STD + (3.5 × X-dimension) | STD + (4 × X-dimension) | STD + (4.5 × X-dimension) | STD + (5 × X-dimension) | ... | |
| . | . | . | . | . | . | . | . | |
| . | . | . | . | . | . | . | . | |
| . | . | . | . | . | . | . | . | |

Based on the equations of Table 5, the processor 60, in step 120, fills in the lost element matrix with estimated center distances between resolved elements using the X-dimension of 6 and the STD of 12. Therefore, the smallest 2—2 distance corresponds to the STD of 12 which is input to the first position under the 2—2 column of Table 5. The next largest distance in the 2—2 column must include the width of one 1-wide element, and corresponds to the STD plus the X-dimension or 12+6=18. The next largest distance must include the width of two 1-wide elements for a total of 24, and so forth for all entries in the 2—2 column of Table 5. The smallest 2-3 center distance corresponds to the STD of 12 plus one-half the X-dimension or 15, while the next largest distance must include the width of a single 1-wide element (i.e., 15 plus the X-dimension, or 21), and so forth for the 2-3 column in Table 5. The processor 60 continues to fill in the lost element matrix in a similar fashion for the 2-wide space and a 3-wide space in the stop pattern. (Again, the profile of FIG. 16 is a reverse scan, and therefore begins with the stop character.) The measured center distance is 37, which corresponds to a distance between a 2-wide space and a 3-wide space. Since these two resolved elements are spaces that appear adjacent to each other in the profile, only an odd number of 1-wide elements can exist between them. Based on the knowledge that the stop pattern for the PDF417 symbology always includes three 1-wide elements between the 2-wide and 3-wide spaces, a bar-space-bar triplet exists between the two resolved spaces. Therefore, the processor 60 determines that a center distance of approximately 37 between a 2-wide element and a 3-wide elements corresponds to three 1-wide elements unresolved therebetween. A lost element matrix may thereby be constructed as shown below.

TABLE 6

INITIAL LOST ELEMENT MATRIX USING KNOWN DISTANCES FROM START/STOP PATTERNS

Estimated Distance Between Centers of Resolved Element Pairs

| Number of Lost Elements | Lost Element Parity | 2–2 | 2–3 | 2–4<br>3–3 | 2–5<br>3–4 | 2–6<br>3–5<br>4–4 | 2–7<br>3–6<br>4–5 | 3–7<br>4–6<br>5–5 | 4–7<br>3–8<br>5–6 | 5–7<br>6–6 | 6–7 |
|---|---|---|---|---|---|---|---|---|---|---|---|
| 0 | (Opposite) | | | | | | | | | | |
| 1 | (Adjacent) | | | | | | | | | | |
| 2 | (Opposite) | | | | | | 42 | | | | |
| 3 | (Adjacent) | | 37 | | | | | | | | |
| 4 | (Opposite) | | | | | | | | | | |
| 5 | (Adjacent) | | | | | | | | | | |
| 6 | (Opposite) | | | | | | | 70 | | | |
| 7 | (Adjacent) | | | | | | | | | | |
| 8 | (Opposite) | | | | | | | | | | |
| 9 | (Adjacent) | | | | | | | | | | |
| 10 | (Opposite) | | | | | | | | | | |

The processor 60 is able to include the values of 42 and 70 in Table 6 above based on the knowledge that the center distance of 42 between the 3-wide space and the 7-wide bar in the stop pattern includes two unresolved 1-wide elements (a bar-space doublet). Similarly, the processor 60 recognizes that the start pattern in the PDF417 symbology includes an 8-wide bar and a 3-wide space enclosing six 1-wide elements. As a result, the measured center distance of 70 for the 3–8 situation is shown in Table 6 above.

From the three values entered into Table 6, the processor 60 can calculated the rest of the values in the lost element matrix. For example, the 2–3 and 3–7 situations in the stop character can be averaged together to produce an estimated X-dimension: 37+42=79, which encloses a total of 12.5 X-dimensions, producing an X-dimension of 6.32 (i.e., 79/12.5=6.32). Based on the computed X-dimension of 6.32, the processor 60 then adds and subtracts one-half of this value (i.e., 3.16) to fill in the lost element matrix, as shown partially filled in below as Table 7.

determines that the measured width of 19 corresponds most closely to the estimated width for a 3-wide space. Therefore, the processor 60 fills in row 128 with a corresponding "3" below the value "19" in row 126. While the processor 60 preferably compares each measured width in row 126 to Tables 2 and 3 in step 119, and fills in row 128 in its entirety before proceeding with any further processing of the profile, the processor 60 can fill in row 128 as it serially analyzes each center distance in row 124 from left to right.

In rows 126 and 128, a positive value indicates a space or peak in the profile (high reflectance), while a negative value indicates a bar or valley (low reflectance). For example, the values of "19" and "–38" in row 126 refer to the measured widths of a resolved space and bar, respectively, while the values of "3" and "–7" in row 128 refer to a 3-wide space and 7-wide bar, respectively.

Based on knowledge of the start and stop patterns in the PDF417 symbology, the processor 60 is step 122 begins by filling in the unresolved wide elements at the beginning and

TABLE 7

EXEMPLARY LOST ELEMENT MATRIX USING KNOWN DISTANCES IN START/STOP PATTERNS

| Number of Lost Elements | Lost Element Parity | Estimated Distance Between Centers of Resolved Element Pairs | | | | | | | | | |
|---|---|---|---|---|---|---|---|---|---|---|---|
| | | 2–2 | 2–3 | 2–4 3–3 | 2–5 3–4 | 2–6 3–5 4–4 | 2–7 3–6 4–5 | 3–7st 4–6 5–5 | 4–7 3–8sp 5–6 | 5–7 6–6 | 6–7 |
| 0 | (Opposite) | 14.9 | 18.0 | 21.2 | 24.4 | 27.5 | 30.7 | 33.8 | 37.0 | 40.2 | 43.3 |
| 1 | (Adjacent) | 21.2 | 24.4 | 27.5 | 30.7 | 33.8 | 37.0 | 40.2 | 43.3 | 46.5 | |
| 2 | (Opposite) | 27.5 | 30.7 | 33.8 | 37.0 | 40.2 | 43.3 | 42 | 49.6 | | |
| 3 | (Adjacent) | 33.8 | 37 | 40.2 | 43.3 | 46.5 | 49.6 | 52.8 | 56.0 | | |
| 4 | (Opposite) | 40.2 | 43.3 | 46.5 | 49.6 | 52.8 | 56.0 | | | | |
| 5 | (Adjacent) | 46.5 | 49.6 | 52.8 | 56.0 | | | | | | |
| 6 | (opposite) | 52.8 | 56.0 | | | | | | | | |

After filling in the lost element matrix in step 120, the processor 60, in step 122, compares each center distance as measured in step 115 to the entries in the matrix to find the closest estimated distance in the matrix. Based on the closest estimated distance in the matrix, the processor 60 determines the number of 1-wide elements lost between two resolved wider elements from the left hand column of the matrix. Rather than simply matching a given measured center distance to all distances in the matrix, the processor 60 selects the appropriate column in the matrix based on the widths of resolved elements bordering the center distance as previously determined in step 119. As a check, the processor 60 in step 122 determines whether the resolved elements are opposite or adjacent to ensure that the correct row in the matrix is selected based on the parity of the resolved elements.

In step 122, the processor 60 constructs a decode table, array or matrix, an example of which is shown in FIG. 17. The decode matrix of FIG. 17 shows, in row 124, all of the measured center distances between resolved element pairs taken from the profile of FIG. 16. Row 126, below and offset from row 124, shows all of the measured widths of the resolved elements which border the measured center distances in row 124.

Row 128 contains the size of the resolved elements. Processor 60 fills in row 128 by comparing the measured widths in row 126 to the estimated widths in Table 2 or 3, as mentioned above. For example, if the processor 60 determines that a space has a measured width in row 126 of 19, the processor compares this width to Table 2 and end of the profile. Thereafter, the processor 60 compares the left-most measured center distance in row 124 to determine the number of lost elements within that distance, and then continues rightward along row 124. The processor 60 need not analyze the measured center distances from left to right in row 124, but for example, can start in the middle of the string of measured center distances in the row.

The first center distance in row 124, following the 7-wide bar, is 34, which is bordered by the 7-wide bar to the left and a 4-wide space to the right. The processor 60 in step 122, compares the measured center distance to the estimated center distances provided in Table 7, under the appropriate column. Therefore, in this example, the 7-wide bar next to a 4-wide space would correspond to the "4–7" column in Table 7, and the measured center distance of 34 corresponds closely to the estimated distance of 37 in the table, especially since the next possible distance is 49.6. Based on the estimated center distance of 37 in Table 7, the processor 60 determines that zero 1-wide elements are lost between the 7-wide bar and the 4-wide space.

As a check, the processor 60 in step 122 also compares the parity of the resolved elements bordering the measured center distance to the lost element parity column in Table 7. The processor 60 knows from row 128 that the resolved elements bordering the measured center distance are a bar and a space (the 7-wide bar next to a 4-wide space), and therefore that the elements are considered opposite. The processor 60 in step 122 recognizes from Table 7 that the parity for zero lost elements requires opposite resolved elements. Thus, the parity matches, which confirms that zero 1-wide elements are lost within the measured center distance of 34. The processor 60 in step 122 begins to fill in row 130, which indicates the number of unresolved 1-wide elements lost between resolved elements, with a value of "0," beneath the measured center distance of 34 in row 124 above.

The next measured center distance is 19, which is between the 4-wide space to the left and a 2-wide bar to the right. Under column 2-4 of Table 7, the measured center distance most closely correlates to the estimated center distance of 21.2, and thus zero 1-wide elements are lost therebetween. Zero lost elements corresponds to an opposite parity, and the 4-wide space next to the 2-wide bar corresponds to opposite elements, thus the parity matches. Consequently, the processor 60 stores or enters a 0 in row 130.

The next measured center distance of interest is 35, which falls between two 3-wide bars. Under column 3—3 of Table 7, the measured center distance most closely correlates to the estimated center distance of 33.8, corresponding to two 1-wide elements lost therebetween. Two lost elements corresponds to an opposite parity, however, the 3-wide bar next to another 3-wide bar corresponds to adjacent elements, therefore the parity conflicts. Consequently, the processor 60 selects the next closest estimated distance in Table 7 under the 3—3 column, which is 40.2, corresponding to three 1-wide elements lost between the two 3-wide bars. The parity matches, and thus the processor 60 enters a "3" in row 130.

The processor 60 knows that three 1-wide elements are lost between the two 3-wide bars, rather than a single 3-wide space, because all of the 2-wide or greater elements are resolved; only the 1-wide elements are lost. Since the parity must match for a given entry in Table 7, the method under the present invention is considerably tolerant of errors in any estimated center distances, estimated widths, and so forth. The estimated or measured distances can be off by as much as several whole integer units in either direction before the method under the present invention produces an error. In this example, the estimated distance in Table 7 closest to the measured center distance of 35, with the appropriate parity, is 40.2, for a difference of 5.2, rather than 27.5, which produces a differences of 7.5. In fact, under the present invention, a measured centers distance may be off by the width of a whole 1-wide element (i.e., a whole X-dimension) and still be properly decoded.

Row 132 in FIG. 17 shows the resulting string of element widths as the processor 60 fills in the decode matrix for all unresolved 1-wide elements in row 130. For example, row 130 shows that "3" elements are lost between the first 3-wide space and the 7-wide bar shown in row 128. Therefore, the processor 60 creates row 132 as a composite of rows 128 and 130, with a "3" and a "7" below the same entries above in row 128, and three "1s" therebetween below the "3" entry in row 130. The positive and negative distinction between bars and spaces is dropped because they are unnecessary once the narrow elements have been found. Therefore, the first 7-wide bar in the profile is shown in row 128 as "–7," but is shown in row 132 as "7."

In step 133 of FIG. 14B, the processor 60 converts the resulting string of element widths in row 132 into a string of elements that are parsed into characters, as shown in row 134 of FIG. 17. In step 133, the processor 60 analyzes each symbol character to ensure that it includes the correct number of modules for a given symbology. For example, each symbol character in the PDF417 symbology includes 17 modules. Therefore, for the PDF417 symbology, the total number of modules per single character can be represented by the following equation:

$$[b_1+s_1+b_2+s_2+b_3+s_3+b_4+s_4]=17 \text{ modules} \quad (1)$$

where $b_1$ through $b_4$ and $s_1$ through $s_4$ represent the sizes of the bars and spaces, respectively, in a given symbol character. Each row in the symbol 102 includes three symbol characters between the start and stop patterns. The total number of modules in the first symbol character, following the stop pattern, equals 17, and therefore includes the appropriate number of modules (i.e., 4+2+2+3+1+1+1+3= 17). The remaining two characters in row 134 similarly include 17 modules.

The processor 60 in step 133 can also determine that the string of elements in row 134 includes the appropriate number of total elements for a given symbology. For the PDF417 symbology, each row in a given symbol must have a number of elements based on the following formula:

$$\text{Number of Elements per Row}=8C+1 \text{ elements} \quad (2)$$

where C is the number of symbol characters. As noted above, each row in the symbol 102 includes three symbol characters, plus start and stop characters. Therefore, under equation (1), each row must include 41 elements. Counting the string of elements in row 134 and adding one shows that the processor 60 has identified 41 elements. Therefore, the processor 60 has identified the correct number of elements for the second row of the symbol 102.

As noted above, many symbologies include redundancy in their encodation scheme which the present invention uses to locate lost narrow elements in unresolved profiles. Additionally, most linear symbologies include symbol character self-checking parity. For example, the bars in Code 128 only have an even number of modules. Therefore, if the processor 60 under the present invention knows that a given profile was generated from a Code 128 symbol, and the processor determines from the decode matrix that a given bar has an odd number of modules, the processor recognizes that the width of that bar has been erroneously determined.

Most stacked symbologies include row identification parity which is used by laser scanners to determine in which row the laser scamming beam is currently scanning. For example, Code 49 employs alternating rows of symbol characters having even parity or odd parity within a given row. Since the present invention preferably uses an imager-type reader, the processor 60 can distinguish between rows without resorting to any row identification parity. Therefore, the processor 60 can use the row identification parity redundancy or symbol character self-checking parity in symbologies to check for and then correct the determined widths of wide elements that were previously, but erroneously, determined in step 119.

Therefore, for PDF417 symbols, the processor 60 in step 133 also checks the row identification, or "cluster" parity, for each symbol character. The "cluster parity" is a standard row identification parity check known and used in the PDF417 symbology. Under the cluster parity calculation, the sizes of the bars in a given symbol character are alternately added and subtracted in a given character symbol and the modulo 9 of the result taken so as to all produce the same value in a given row (a value of 0, 3 or 6). The cluster parity calculation for the PDF417 symbology can be summarized in the following equation:

$$(b_1-b_2+b_3-b_4+9) \bmod 9=0, 3 \text{ or } 6 \quad (3)$$

where $b_1$ through $b_4$ are the sizes of the bars extending from left to right (or from start to stop characters) in a give symbol character.

If the string of elements in row 134 includes the correct number of modules under equation (1), the correct number of elements under equation (2), and the correct cluster parity under equation (3), then in step 136, the processor 60 decodes the symbol characters of row 134 using known methods particular to the given symbology. For example, the PDF417 symbology includes higher level error correction, detection and interpretation modules or algorithms, which the processor 60 performs to convert the symbol characters into data characters.

Figure 18:
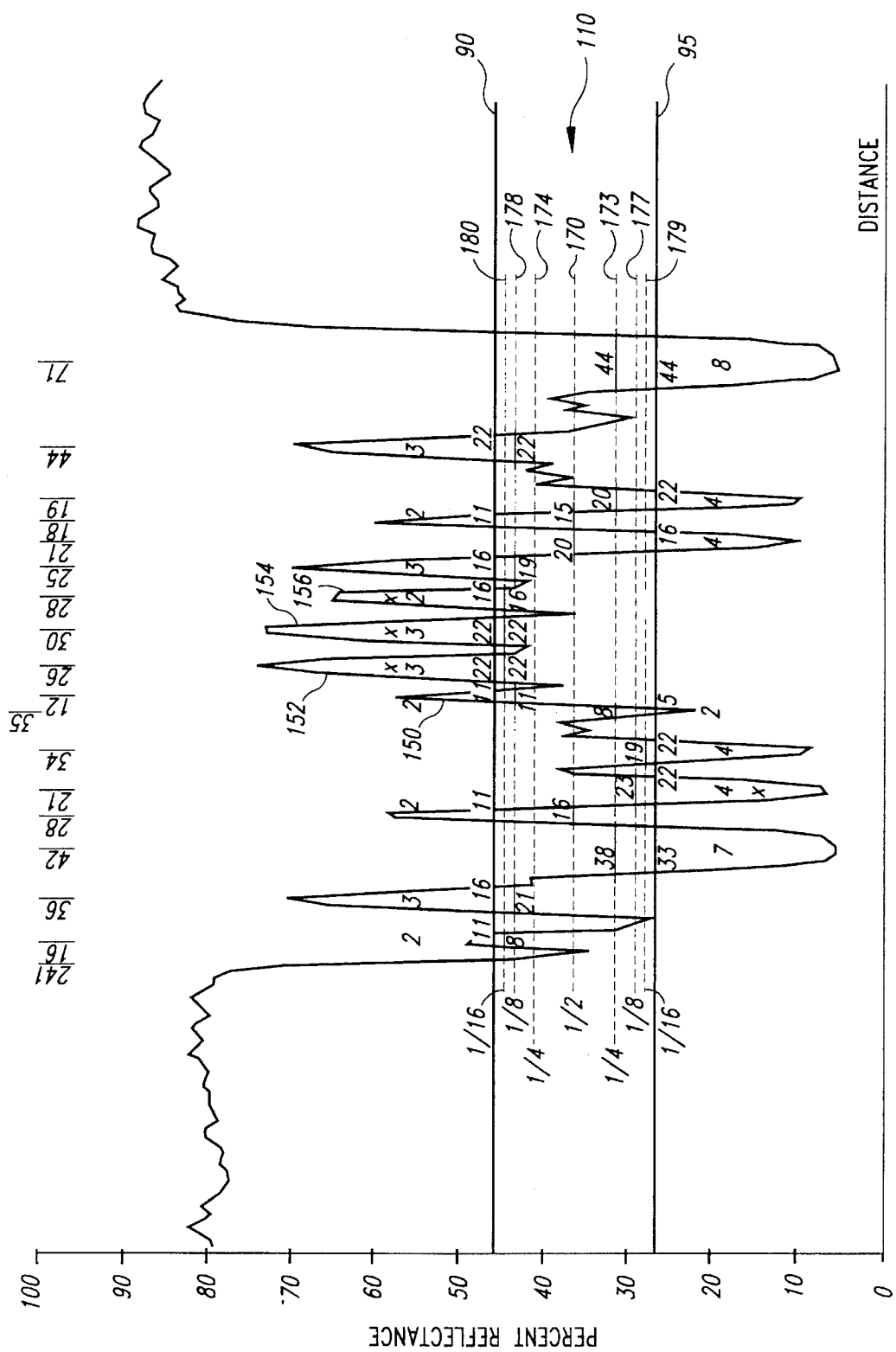
FIG. 18 is an example of a profile similar to the profile of FIG. 16, but which was produced from the third row of the symbol of FIG. 6.

If the processor 60 in step 133 determines that the string of elements in row 134 has an incorrect number of modules or elements, or fails the cluster parity, then in step 138, the processor identifies the module or cluster parity deficiency for each symbol character in row 134. For example, FIG. 18 shows an unresolved profile similar to that of FIG. 16, but taken from the third row of the symbol 102. After performing steps 104 through 133, the processor 60 produces the following string of elements parsed into symbol characters:

121113117    24141112    21313121    34241111    31111118.

Under step 133, the processor 60 determines under equation (2) that the string of elements includes 41 elements and thus includes the correct number of elements. The first, fourth and last symbol characters contain the correct number of modules under equation (1). Additionally, the first, fourth and last symbol characters produce a cluster parity of 0 under equation (3), and therefore are correct. The processor 60, however, identifies errors in the second and third symbol characters of the string of elements.

Considering the third symbol character first under equation (1), it contains an incorrect number of modules:

2+1+3+1+3+1+2+1=14≠17 modules.

The third symbol character, however, provides the correct cluster parity under equation (3):

(1−1+1−1+9)mod 9=0.

Therefore, the sizes of the bars must be correct. Consequently, the sizes of at least some of the spaces must be incorrect. The processor 60 recognizes that the bar measurements must be correct, since if they were larger, the bars would be resolved, thus leading to an entirely different profile. As a result, three of the four spaces must be increased by one module to produce the correct number of 17 total modules for the symbol character under equation (1).

The processor 60 is step 140 corrects all symbol characters that have one or more missing or extra modules, so that the symbol characters have the appropriate number of modules (i.e., 17 modules for the PDF417 symbology). The processor 60 analyzes each of the wide elements in an erroneous symbol character. Since equation (3) provided the appropriate cluster parity, the processor 60 recognizes that the errors are in the spaces, and therefore, analyzes the wide spaces. The wide space 150 in FIG. 18 is correct because it has the smallest width of the four spaces in the third symbol character. Additionally, the processor 60 recognizes that the 2-wide space 150 has a distance of 12 from its center rightward, which would not likely be a measurement from a 2–3 situation. Consequently, the processor 60 under step 140 increases the size of each of the three spaces which follow (spaces 152, 154 and 156 in FIG. 18) by one to produce the following string of elements:

21414131.

Analyzing the second symbol character, the processor 60 in step 138 recognizes that the symbol character has an incorrect number of modules under equation (1):

2+4+1+4+1+1+1+2=16≠17.

Additionally, in step 138, the processor 60 recognizes that the cluster parity for the second symbol character is also incorrect under equation (3):

(2−1+4−4+9)mod 9=1.

(Note: since the profile of FIG. 18 is a reverse scan, cluster calculations start with the right-most bar and move to the left.) As noted above, the cluster parity algorithm must lead to a 0, 3 or 6 result. Since the processor 60 knows that the second character is in the third row of the symbol, the processor knows that the character must provide a cluster parity of 0. As a result, the processor 60, in step 138, recognizes that the symbol character is missing one module based on equation (1), and that the error occurs in the estimated width of one of the bars. Since the 1-wide bar must be correct (otherwise, it would be resolved), the error must be in either the 2-wide or in one of the 4-wide bars.

In step 140, the processor 60 attempts to identify the wide bar having an extra module or missing a module in step 140, but fails to readily produce a result. Therefore, in step 142, the processor 60 analyzes the cluster parity equation (3), by using any number of methods, e.g., recursive calculations, and determines that if the right-most 4-wide or 2-wide elements are increased by one, the cluster parity equation produces a result of 0. The processor 60 determines in step 142 that only by increasing the left-most 4-wide bar does the cluster parity equation provide a 0 result. Consequently, in step 142, the processor 60 produces the following string of elements for the second symbol character:

25141112.

In step 142, the processor 60 can alternatively set up all possible equations, such as the cluster parity equation, total element equation and total module equation to solve four of the unknowns. Additionally, the processor 60 can analyze the center distances and measured element widths in the profile of FIG. 18 to determine which of the measured center distances and measured element widths differs most significantly from the estimated distances and estimated widths from Tables 6, 2 and 3, respectively. Those skilled in the art will recognize that any technique for detecting and correcting errors in the string of elements derived from the lost element matrix and/or decode table can be used under the present invention. After generating the correct string of elements for the erroneous symbol characters in steps 138–142, the processor 60, in step 144, decodes the symbol characters using known algorithms in step 144.

In addition to the steps discussed above, the routine 100 can include several alternative or additional steps. For example, if the reader 50 is to read many symbols, most of which are out of focus, the routine 100 can more rapidly decode closure profiles by not wasting processing time on attempting to decode a closure profile in step 106. Instead, the processor 60 can proceed immediately with steps necessary for decoding a closure profile (steps 107–144).

While the processor 60 can determine the upper and lower closure boundaries 90 and 95 based on the crossing count of the peaks and valleys, the processor can also establish the boundaries in step 107 under various alternative methods. For example, the processor 60 can examine the profile itself to establish the upper and lower closure boundaries 90 and

95. As explained above, the peaks in the profile of FIG. 16, if resolved, are at the top of the profile to represent spaces in the symbol 102. In the closure profile shown in FIG. 16, however, the peaks of the 1-wide spaces are quite low in reflectance, and several peaks are found at approximately 35% reflectance. The processor 60, in step 107, therefore examines the profile, locates the lowest peak in the profile, and establishes the lower closure boundary 95 as the reflectance of the lowest peak within the profile.

Conversely, the valleys in the profile of FIG. 16, if resolved, are at the bottom of the profile to represent the bars in the symbol 102. In the closure profiles shown in FIG. 16, however, the valleys of the 1-wide bars are quite high in reflectance, and several valleys are found at approximately 37% reflectance. The processor 60, in step 107, therefore also examines the profile to locate the highest valley in the profile, and establishes the lower upper boundary 90 as the reflectance of the highest valley within the profile. Overall, when the highest valley is above the lowest peak in a profile, excluding element defects such as spots or voids caused during printing of the symbol, the profile is a closure profile and no narrow elements are effectively resolved.

Other alternative methods of determining the upper and lower closure boundaries 90 and 95 include analyzing the profile to determine a mean reflectance threshold. Thereafter, the processor 60 selects the upper closure boundary 90 as a fixed percent reflectance increase from the mean, and the lower closure boundary 95 as a fixed decrease from the mean. Having determined the upper and lower closure boundaries 90 and 95, the processor 60 in step 107 identifies resolved elements as those portions of the profile extending above or below the closure boundaries.

The processor 60 establishes the upper and lower closure boundaries 90 and 95 to determine which peaks and valleys in the profile correspond to resolved elements. Alternative methods of analyzing the profile to determine which peaks and valleys correspond to resolved elements include analyzing the slopes of the various peaks and valleys in the profile. For example, as the processor 60 analyzes the portion of the profile in FIG. 16 from the peak 83 rightward, the slope of the profile has a great negative slope value as the profile extends from the peak 83 to the next valley. The processor 60 therefore determines that the peak 83 is a resolved space. Additionally, the processor 60 determines from the steep slope that zero 1-wide elements are lost. Alternatively, analyzing the profile from the valley 77 leftward to the high peak, the slope of the profile has a great negative value until the profile extends into the closure region 110. Within the closure region 110, however, the slope changes value several times from negative to positive and then back to negative as the profile extends toward the high peak. The processor 60 recognizes the change in slope within the closure region 110 as a portion within the profile which contains unresolved 1-wide elements. After analyzing the changing slopes in the profile, the processor 60, using known mathematical techniques, can identify the resolved peaks and valleys in the profile.

In step 116, the processor 60 can additionally identify the start and stop characters or left and right guard patterns for a symbol and determine the type of symbol (i.e., from which symbology the symbol belongs), based on the start and stop characters for the symbol. For example, under the U.P.C.-A symbology, all U.P.C.-A symbols begin and end with guard patterns consisting of two 1-wide bars enclosing a 1-wide space, and have a center guard pattern consisting of five 1-wide spaces separated by two 1-wide bars. No other symbology includes such start/stop characters or guard patterns. The processor 60 identifies a profile as being generated from a U.P.C.-A symbol if the profile contains unresolved portions at the beginning, end and middle of the profile.

Other symbologies have similar unique patterns or features which the processor 60 identifies to determine the type of symbol from which a given profile was generated even when the profile results from some unresolved elements. All Code 93 symbols have a stop character that has a 4-wide bar separated from the quiet zone by two 1-wide elements. The processor 60 determines that a given unresolved profile was generated from a Code 93 symbol by identifying a large valley (the large bar) at the end of the profile next to a high peak (the quiet zone).

As noted above, all PDF417 symbols have start and stop characters that each begin with the largest width bars available in that symbology, i.e., 7-wide and 8-wide bars. In analyzing a given profile, the processor 60 in step 304 readily identifies a PDF417 profile by locating the very large valleys at the beginning and end of the profile. If the profile contains such large valleys at the beginning and end of the profile, and then identifies other smaller peaks and valleys in the profile, the processor 60 determines that the profile was generated from a PDF417 symbol.

After identifying the start/stop characters and determining the type of symbol, the processor 60, in step 116, can determine if the profile includes acceleration distortions. Acceleration distortions are generally produced when movement of the reading beam was accelerated across the symbol as the profile was generated. Acceleration distortions are common in profiles generated from hand-held wand readers, but such distortions are less severe in laser scanning and image-based readers.

The processor 60 determines if a profile includes acceleration distortion by comparing the dimensions of the start character to the dimensions of the stop character, and/or these dimensions to the overall dimensions of the profile. For a U.P.C. symbol, the processor 60 compares the distance between the beginning of the profile to its middle, and the middle of the profile to its end. The processor 60 can locate the middle of the profile in FIG. 3 by locating the area in which many (at least five) 1-wide elements are unresolved (corresponding to the center guard pattern). If the distance from the beginning of the profile to its center differs significantly from the distance of the center of the profile to its end, the processor 60 applies a compensation factor, using known techniques, to compensate for the acceleration distortion.

Similar methods of determining whether a profile contains accelerations distortions are available by using the start and stop patterns from the various symbologies. For example, with PDF417 symbols, the processor 60 compares the width of the valleys in the profile produced by the 7-wide and 8-wide bars at the beginning and the end of the PDF417 symbol. If the two widths vary significantly, the processor 60 applies an appropriate compensation factor based on the known ratio between the widths of these wide bars.

In step 116, the processor 60 can also estimate the X-dimension under several alternative methods. For example, all U.P.C.-A symbols have a fixed width that includes a total of 95 modules. All Code 49 symbols have a fixed width that includes a total of 70 modules. Some other symbologies have fixed widths which contain a predetermined number of modules, or discrete widths, that can be algorithmically determined. If the X-dimension is 9 for a given U.P.C.-A symbol, then the symbol has a total width, from the left hand edge of its left guard pattern to the right hand edge of its right guard pattern, of 9 times 95 or 855.

Consequently, if the reader 50 produces a profile from a U.P.C.-A. symbol with very little acceleration distortion, the processor 60 determines the X-dimension by simply dividing the sum of the center distances by 97. The total center distance is divided by 97, not 95, because the two additional modules correspond to an implied 2-wide space at the quiet zone following one of the left or right guard patterns. If the processor 60 determines that the profile contains acceleration distortions, however, or determines that the profile was generated from a non-fixed width symbology, then the X-dimension is determined as described above.

Some symbols have no instances of 2-wide elements next to each other (i.e., no STD), so that the smallest center distance involves a 2-wide element next to a 3-wide element. Such a 2–3 situation can be identified by comparing the smallest center distance to the width of the elements bordering the 2–3 distance. If the widths of the elements are significantly dissimilar, then the processor 60 determines that the smallest center distance corresponds to the 2–3 situation in the manner described above. As a result, the processor 60 can produce the X-dimension in step 116 by dividing the smallest center distance by 2.5.

As noted above, the processor 60 can average the estimated widths and center distances in the above tables. For like resolved elements analyzed or measured during step 115, the processor 60 updates the estimated widths for all like 2-wide elements, and larger elements, in Tables 2 and 3. For example, the first three valleys following valleys 75 and 74 in FIG. 16 have measured widths of 15, 14, and 14. According to Table 2, all three of these widths correspond to 3-wide bars. Averaging these three widths together produces an average width for 3-wide bars of 14.33. Dividing this average value by 3 produces an estimated X-dimension of 4.78. This more accurate X-dimension differs from the previously estimated X-dimension (6.77) by 1.99. The more accurate X-dimension can then be used to update the above tables (e.g., Tables 2, 3 and the lost element matrix).

Similar averaging can be performed for the estimated center distances in the lost element matrix. The processor 60 in steps 120 and 122 can alternatively average the center distances that the processor 60 examines to compute a new X-dimension and recursively update the lost element matrix. For example, the processor 60 in step 120 can begin by first examining the small center distances in the profile of FIG. 16. The processor 60 then averages these distances and adjusts the estimated X-dimension and the above tables, if necessary. The processor 60 in steps 120 and 122 continues to analyze groups of increasing sizes of measured center distances and updates estimated values accordingly.

Such iterative calculation and averaging can provide a more accurate representation of the estimated center distances, X-dimension, and estimated element widths, and thus provides a more accurate decoding method for a closure profile. Importantly, any error that the processor 60 initially computes for the X-dimension, or other estimated widths/distances, is not carried forward and exaggerated as the above tables are created and filled in for larger width elements or center distances. Additionally, the processor 60, in step 118, can use the above tables for several profiles, rather than reconstructing these tables for each profile. This alternative is particularly true when reading stacked symbologies where each row likely produces an unresolved profile having similar distortions, typically when read by imager-type readers. Such an alternative method would also be useful in laser-scanners where the scanner is able to determine the location of the scanning laser beam on the symbol being read. A reader frequently reading many out-of-focus symbols or symbols beyond the standard resolution for the reader can generate the above tables once, and then apply those tables for similar symbols.

The processor 60 in step 122 can analyze a given measured center distance in a profile and then compare the parity of the adjacent resolved elements before determining the appropriate column in Table 7. For example, a measured center distance of 35 between two bars would correspond to only the rows in Table 7 that correspond to the adjacent lost element parity. As a result, the processor 60 may more readily determine the correct estimated center distance, especially if only one of the widths of the resolved elements were known.

To summarize, the present invention provides a method of reading a given machine-readable symbol at distances significantly beyond the normal range of resolution of a given reader, reading symbols with X-dimensions smaller than a given X-dimension normally readable by a given reader, and reading profiles containing noise (created by, e.g., electrical noise or printing defects). The present invention does not depend on complex mathematics and can be used with all processor controlled readers having any type of optical configuration (e.g., laser scanners, wands, CCD imagers, etc.). The narrow elements in a given symbol are redundant, and therefore, are not required to decode the symbol under the present invention. The processor 60 under routine 100 need only analyze the reflectance information, the location of the centers of resolved wide elements, and the widths of the resolved elements at the appropriate quantized closure boundary to locate all unresolved narrow elements. As a result, the present invention can decode a profile exhibiting such closure that none of the 1-wide elements are recognizable in the profile. The present invention in part relies on the distances between the centers of resolved elements, rather than the edges of these elements, in a profile. Consequently, the method of the present invention is immune to ambiguity associated with standard decoding methods that use on edge-to-edge measurements in a profile. Additionally, the present invention can decode profiles that contain a significant amount of noise, such that the edges of elements in the profile cannot be found under standard decoding methods.

The inventor's application Ser. No. 08/008,768, filed Jan. 22, 1993, provided a method of decoding closure profiles produced from simple 2-width symbologies, such as Code 39, by simply using the peak-to-peak center distances. The inventor's application Ser. No. 08/327,972, filed Oct. 24, 1994, provided a method of decoding closure profiles produced from simple multi-width symbologies, such as U.P.C., based on the center distances and estimated widths of the resolved elements as measured at upper and lower closure boundaries. The present invention provides a method of decoding closure profiles produced from complex multi-width symbologies, such as PDF417 and Code 49, by using the center distances and the widths of resolved elements as measured at quantized thresholds. A difficulty in decoding unresolved profiled produced from complex multi-width symbologies is in distinguishing the size of resolved elements since the width of these elements are distorted based on their environments.

Those skilled in the art will recognize that the above-described invention provides a method of decoding unresolved profiles produced from machine-readable symbols. Although specific embodiments of, and examples for, the present invention have been described for purposes of illustration, various equivalent modifications can be made without departing from the spirit and scope of the invention. For example, rather than generating and measuring element widths at the quantized thresholds under steps 110 through 115, the processor 60 may instead perform an integration method to determine the area under the curve for each resolved element at the upper and lower closure boundaries 90 and 95. The area under the curve may then be used to generate Tables 2 and 3 and determine the widths of the resolved elements.

Alternatively, the processor 60 can avoid performing steps 108 through 115 and instead determine the widths of resolved elements based on an estimated amount of ink spread. As noted above, ink spread often results in varying the widths of elements, especially between bars and spaces. By applying an ink spread factor to the widths measured at the upper and lower closure boundaries 90 and 95, the processor 60 can likely determine the widths of resolved elements at these two boundaries (rather than at the quantized thresholds).

Furthermore, the processor 60 can determine the widths of resolved elements by creating a grid of distortions as a function of the closure ratio. The "closure ratio" is a distortion factor affecting a closure profile. The closure ratio can be estimated as the difference between the closure boundaries and the distortion can be calculated for each ratio and for each of the six above-mentioned element environments. Such an approach, however, can be cumbersome and is non-linear. Those skilled in the art will recognize that any technique for accurately measuring the width of resolved elements can be used under the present invention.

While the present invention has been described above with respect to a method performed by the processor 60, the routine 100 can be implemented using appropriate circuitry. As shown in FIG. 19, a reader 400 includes the light source 52, sensor 54 and receiver 56 as described above. A detection circuit 410 receives the profile produced by the receiver 56, and detects which portions of the profile correspond to resolved wide elements. As described above for steps 107–111, the detection circuit 410 establishes quantized upper and lower closure boundaries as described above, analyzes the profile to determine which portions of the profile extend above or below the boundaries, and produces a resolved element signal.

A measuring circuit 412 receives the resolved element signal and measures the center distances between the elements (as in step 115). The measuring circuit 412 also measures the width of resolved elements at the appropriate quantized closure boundary and determines a given measured element width corresponds to a 2-wide, 3-wide or greater element (steps 107–119). A slope detection circuit 414 can be used in addition to, or in lieu of, the detection circuit 410 to determine which elements are resolved, the size of the resolved elements, and determine whether no 1-wide elements are lost (as described above in step 108). Additionally, the circuit 414 may operate with, or in lieu of, the detection circuit 410 to establish the quantized upper and lower closure boundaries (steps 107–119).

A decoding circuit 416 essentially performs steps 120–144 as described above with respect to the lost element matrix and determines the number and location of 1-width elements lost within the profile. The decoding circuit 416 may thereby decode the signal after having determined the location and number of lost 1-wide elements within the profile. Instead of the measuring circuit 412, the decoding circuit 416 can be a microprocessor and can determine the size of a measured element (i.e., whether it is a 2-, 3-, a 4-wide, etc.).

Additionally, while the routine 100 and its alternatives are described as determining the number of lost elements in a profile based the center distances and the widths of all resolved elements at quantized closure boundaries, those skilled in the art can modify the present invention based on the detailed description provided herein to allow the present invention to determine the number of lost 1-wide elements based on the measured center distances and the estimated widths of only a few of the wide elements. Furthermore, the present invention is described above graphically for ease of presentation and understanding. Those skilled in the art will recognize that the reader 50 of the present invention preferably does not graphically analyze and decode a given unresolved profile. For example, the lost element and decode matrices are shown and described above as having a certain depicted form (i.e., Tables 2 through 7 and FIG. 17). The present invention need not construct such matrices per se, as shown above, but instead simply performs the necessary routines and calculations in order to decode unresolved profiles, such as counting a number of loops in an iterative process to determine the number of lost elements. While the present invention is described above as "measuring," e.g., at an appropriate quantized threshold, the present invention preferably calculates the width or center distances from the profile by interpolating with respect to the profile, particularly when a finite number of pixels are used to generate the profile. Accordingly, the present invention is not limited by the disclosure, but instead its scope is to be determined entirely by reference to the following claims.

I claim:

1. A method of decoding a bar code symbol representing encoded information, the bar code symbol including a plurality of relatively spaced bars having at least first, second and third widths, and spaces between the bars having at least first, second and third widths, the second and third widths being greater than the first width, the method comprising the steps of:

receiving light reflected from the bar code symbol and producing an output signal therefrom that represents the reflectance of the bars and spaces comprising the bar code symbol;

receiving the output signal and producing a wide feature signal resolving the bars and spaces having the second and third widths, but the wide feature signal having unresolved portions that fail to resolve at least some of the bars and spaces having the first width;

receiving the wide feature signal and determining which of the bars and spaces are resolved by defining a first threshold and identifying a plurality of resolved portions in the wide feature signal that extend beyond the first threshold, each of the plurality of resolved portions corresponding to one of the resolved bars and spaces;

determining an environment for each of the plurality of resolved portions based on whether a selected resolved portion is between two other of the plurality of resolved portions, between two unresolved portions, or between a resolved and an unresolved portion in the wide feature signal;

defining at least a second threshold;

measuring a width for each of the plurality of portions at one of the first and second thresholds depending upon the environment of the selected resolved portion;

determining a narrow width of the bars and spaces having the first width based on the measured widths;

determining a number and location of the bars and spaces having the first width based on the determined narrow width and the measured widths; and determining the information encoded in the bar code symbol based on the determined number and location of bars and spaces having the first width and the measured width for each of the plurality of portions.

2. The method of claim 1, further comprising the steps of:

identifying a center for each of the plurality of portions; and measuring distances between the centers of the plurality of portions.

3. The method of claim 2 wherein the step of determining a narrow width includes the steps of:

identifying a preselected center distance between the centers of the plurality of portions; and dividing the preselected center distance by a first predetermined amount to determine the narrow width.

4. The method of claim 3 wherein the preselected center distance in the step of determining a narrow width is a smallest center distance.

5. The method of claim 3 wherein the bar code symbol includes one of a start and stop character, and the preselected center distance in the step of determining a narrow width is a center distance derived from one of the start and stop characters.

6. The method of claim 2 wherein the step of determining a number and location includes the steps of:

creating a lost element matrix that identifies a number of the bars and spaces having the first width that are unresolved between resolved bars and spaces, the lost element matrix being created based on estimated center distances between the resolved bars and spaces and the determined narrow width; and determining the number and location of the bars and spaces having the first width by comparing the center distances measured with respect to the plurality of portions in the wide feature signal to the estimated center distances in the lost element matrix.

7. The method of claim 6, further comprising the steps of:

comparing a selected distance, measured between the centers of selected first and second portions in the plurality of portions, to the lost element matrix to determine a selected number of bars and spaces having the first width that are unresolved between the selected first and second portions;

examining the first and second portions to determine a parity; and ensuring that the selected number of bars and spaces having the first width is correct by determining if the parity of the selected first and second portions correlates to a parity of a selected number of bars and spaces having the first width.

8. The method of claim 7, further comprising the steps of:

creating a decode matrix that identifies the number of bars and spaces having the first width that are unresolved between the resolved bars and spaces in the wide feature signal;

repeating the steps of comparing, examining and ensuring for all of the plurality of portions; and filling in the decode matrix with the identified number of the bars and spaces having the first width if the parity correlates.

9. The method of claim 1 wherein the step of measuring a width includes the step of determining whether the measured width for each portion corresponds to the second width or the third width.

10. The method of claim 9 wherein the step of measuring a width includes the step of estimating a first range of widths of the bars and spaces having the second width and a second range of widths of the bars and spaces having the third width.

11. The method of claim 10 wherein the first and second ranges in the step of measuring a width are derived from the narrow width.

12. The method of claim 10 wherein the step of measuring a width includes the step of averaging a selected number of the widths measured for each portion.

13. The method of claim 9 wherein the step of measuring a width includes the step of estimating a first range of widths of the bars having a second width, a second range of widths of the spaces having a second width, a third range of widths of the bars having the third width, and a fourth range of widths of the spaces having the third width.

14. The method of claim 9 wherein the step of determining a number and location includes the steps of determining whether each portion correctly corresponds to the second width or the third width, and adjusting the correspondence of each portion to the second width or the third width.

15. The method of claim 1 wherein the step of determining an environment includes the step of determining whether a selected unresolved portion corresponds to a single unresolved bar or space having the first width, or more than one bar or space having the first width.

16. The method of claim 15 wherein the step of determining an environment includes the step of examining a slope of the wide feature signal proximate to the selected resolved portion.

17. The method of claim 1 wherein the step of defining at least a second threshold includes the step of defining a plurality of thresholds between the first threshold and the second threshold, and wherein the step of measuring a width measures a width for each of the plurality of portions of one of the plurality of thresholds.

18. The method of claim 17 wherein the plurality of thresholds in the step of defining at least a second threshold are at a distance of $1/2^n$ between the first and second thresholds, where n equals 0, 1, 2, 3 or 4.

19. The method of claim 17 wherein the step of measuring a width measures a width of the selected resolved portion at the first threshold if the selected resolved portion is between two unresolved portions, and at a threshold approximately halfway between the first and second thresholds if the selected resolved portion is between two other of the plurality of resolved portions.

20. The method of claim 1 wherein the step of determining a number and location includes the step of determining if all of the bars and spaces in the bar code symbol have been identified.

21. The method of claim 20 wherein the step of determining a number and location includes the step of performing a parity check on the bar code symbol after determining the number and location of the bars and spaces having the first width.

22. The method of claim 1 wherein the bar code symbol has a predetermined width, and wherein the step of determining a number and location includes the step of determining if the predetermined width is equal to a sum of the widths measured for the plurality of portions and the determined number of bars and spaces having the first width.

23. The method of claim 22 wherein the bar code symbol is from a symbology having a parity, wherein the step of measuring a width includes the step of determining whether the measured width for each portion corresponds to the second width or the third width, and wherein the step of determining a number and location includes the step of correcting a width determined for a given measured width based on the parity in the symbology if the sum of the widths is unequal to the predetermined width.

24. The method of claim 1 wherein the bar code symbol is from a symbology having a row identification parity and wherein the symbol has a predetermined width, wherein the step of measuring a width includes the step of determining whether the measured width for each portion corresponds to the second width or the third width, and wherein the step of determining a number and location includes the steps of determining if the predetermined width is equal to a sum of the widths measured for the plurality of portions and the determined number of bars and spaces having the first width; and correcting a width determined for a given measured width based on the parity in the symbology.

25. The method of claim 1, further comprising the steps of:

identifying start or stop characters in the bar code symbol based on the wide feature signal; and determining a type of symbology from which the bar code symbol was generated based on the identified start or stop characters in the bar code symbol.

26. The method of claim 1, further comprising the steps of:

identifying start or stop characters in the bar code symbol based on the wide feature signal;

determining if the wide feature signal includes an acceleration distortion by comparing a distance between the plurality of portions in the wide feature signal; and applying a compensation factor to the wide feature signal to compensate for the acceleration distortion.

27. The method of claim 1 wherein the step of determining a narrow width comprises the steps of:

averaging at least a few of the widths measured for the plurality of portions that correspond to one of the bars and spaces having one of the second and third widths to produce an average value; and dividing the average value by a predetermined amount to determine the width of the bars and spaces having the first width.

28. The method of claim 1, further comprising the steps of:

determining if all of the bars and spaces having a first, second and third widths are resolved in the wide feature signal, before the step of receiving the wide feature signal; and decoding the wide feature signal if all of the bars and spaces having the first, second and third widths are resolved.

29. A method of decoding a machine-readable symbol representing encoded information, the symbol including a plurality of relatively spaced two-dimensional geometric shapes, the shapes and spaces between the shapes having sizes with at least first, second and third widths in at least one dimension, the second and third widths being greater than the first width, the shapes having a reflectivity less than a reflectivity of the spaces, the method comprising the steps of:

receiving light reflected from the symbol and producing an output signal therefrom that represents the reflectance of the shapes and spaces comprising the symbol;

receiving the output signal and producing a wide feature signal that resolves at least some of the shapes and spaces having the second and third widths, but which fails to resolve at least some of the shapes and spaces having the first width;

receiving the wide feature signal and determining which of the shapes and spaces are resolved by identifying a plurality of portions in the wide feature signal that correspond to the resolved shapes and spaces;

determining the size of each of the identified portions that correspond to the resolved shapes and spaces;

generating a lost element matrix in response to the wide feature signal and the sizes of the identified portions that correspond to the resolved shapes and spaces; and determining the information encoded in the symbol based on the lost element matrix and the determined size of each of the identified portions.

30. The method of claim 29 wherein the step of determining a size includes the step of defining a plurality of thresholds and measuring a width of each of the plurality of portions in the wide feature signal at one of the plurality of thresholds.

31. The method of claim 30 wherein the step of determining a size includes the steps of:

determining a slope of the wide feature signal proximate to each of the plurality of portions; and determining at which of the plurality of thresholds to measure the widths of each of the plurality of portions based on the determined slope.

32. The method of claim 31, further comprising the step of measuring a distance with respect to each of the plurality of portions in the wide feature signal.

33. The method of claim 32 wherein the step of generating a lost element matrix includes the steps of:

creating a lost element matrix that identifies a number of the shapes and spaces having the first width that are unresolved between the resolved shapes and spaces, the lost element matrix being created based on estimated distances between the plurality of portions in the wide feature signal; and determining a number and location of the shapes and spaces having the first width by comparing the distances measured with respect to the plurality of portions in the wide feature signal to the estimated distances in the lost element matrix.

34. The method of claim 33 wherein the step of measuring a distance includes the steps of:

identifying a center for each of the plurality of portions; and measuring distances between the centers of the plurality of portions.

35. The method of claim 33 wherein the symbol is from a symbology having parity, wherein the symbol has a predetermined width, and the method further comprising the steps of determining if all of the shapes and spaces in the symbol have been identified;

determining if the predetermined width is equal to a sum of the determined sizes for each of the identified portions and the determined number of shapes and spaces having the first width; and correcting a size determined for a given identified portion based on the parity in the symbology.

36. The method of claim 29, further comprising the step of determining a width of the shapes and spaces having the first width based on the wide feature signal.

37. The method of claim 35 wherein the step of determining the width of the shapes and spaces having the first width includes the steps of:

measuring at least one distance with respect to the plurality of portions in the wide feature signal; and dividing the measured distance by a predetermined amount to determine the width of the shapes and spaces having the first width.

38. The method of decoding a profile produced from a machine-readable symbol that represents encoded information, the symbol including a plurality of relatively spaced two-dimensional geometric shapes, the shapes and spaces between the shapes having sizes with at least first, second and third widths in at least one dimension, the second and third widths being greater than the first width, the profile resolving at least some of the shapes and spaces having the second and third widths, but failing to resolve at least some of the shapes and spaces having the first width, the spaces having a reflectivity higher than a reflectivity of the shapes, the method comprising the steps of:

determining which of the shapes and spaces are resolved by identifying a plurality of portions in the profile that correspond to the resolved shapes and spaces;

determining the size of the identified plurality of portions that correspond to the resolved shapes and spaces;

determining a number and location of the shapes and spaces having the first width based at least in part on the determined size of the identified plurality of portions that correspond to the resolved shapes and spaces; and determining the information encoded in the symbol based on the determined size of the identified plurality of portions that correspond to the resolved shapes and spaces, and number and location of the shapes and spaces having the first width.

39. An apparatus for decoding a machine-readable symbol representing encoded information, the machine-readable symbol including a plurality of relatively spaced two-dimensional shapes, the geometric shapes and spaces between the shapes having sizes with first, second and third widths in at least one dimension, the second and third widths being greater than the first width, the apparatus comprising:

a sensor that receives light that is reflected from the machine-readable symbol and produces an output signal therefrom that represents the reflectance of the shapes and spaces comprising the symbol;

a receiver that receives the output signal and produces a large shape signal indicative of at least some of the shapes or spaces having the second or third widths, but failing to produce a signal indicative of at least some of the shapes and spaces having the first width; and a processor for processing the large shape signal and producing a signal indicative of the information encoded in the symbol, the processor (i) determining which of the shapes and spaces are resolved by identifying a plurality of portions in the large shape signal that each correspond to one of the resolved shapes and spaces, (ii) determining the size of the resolved shapes and spaces, (iii) generating a lost element matrix in response to the large shape signal and the size of the resolved shapes and spaces, and (iv) producing a signal indicative of the information encoded in the symbol based on the lost element matrix and the determined size of the resolved shapes and spaces.

40. The apparatus of claim 39 wherein the processor defines a plurality of thresholds and measures a width of each of the plurality of portions in the large feature signal at one of the plurality of thresholds.

41. The apparatus of claim 40 wherein the processor determines a slope of the large feature signal proximate to each of the plurality of portions and determines at which of the plurality of thresholds to measure the widths of each of the plurality of portions based on the determined slope.

42. The apparatus of claim 39 wherein the processor measures distances between each of the plurality of portions in the large shape signal.

43. The apparatus of claim 42 wherein the lost element matrix identifies a number of the shapes and spaces having the first width that are unresolved between the resolved shapes and spaces, wherein the processor generates the lost element matrix based on estimated distances between the plurality of portions in the large shape signal, and wherein the processor produces the signal indicative of the information encoded in the symbol by determining a number and location of the shapes and spaces having the first width by comparing the distances measured with respect to the plurality of portions in the large shape signal to the estimated distances in the lost element matrix.

44. The apparatus of claim 42 wherein the processor measures distances by identifying a center for each of the plurality of portions in the large shape signal and measuring distances between the centers of the plurality of portions.

45. The apparatus of claim 39 wherein the processor determines a width of the shapes and spaces having a first width based on the large shape signal.

46. The apparatus of claim 45 wherein the processor determines the width of the shapes and spaces having the first width by measuring at least one distance with respect to the plurality of portions in the large shape signal, and dividing the measured distance by a predetermined amount to determine the width of the shapes and spaces having the first width.

47. The apparatus of claim 39 wherein the processor determines which of the resolved shapes and spaces have the second width and which of the shapes and spaces have the third width based on the measured widths of the plurality of portions.

48. An apparatus for decoding a machine-readable symbol representing encoded information, the machine-readable symbol including a plurality of relatively spaced two-dimensional shapes, the geometric shapes and spaces between the shapes having sizes with first, second and third widths in at least one dimension, the second and third widths being greater than the first width, the apparatus comprising:

a sensor that receives light that is reflected from the machine-readable symbol and produces an output signal therefrom that represents the reflectance of the shapes and spaces comprising the symbol;

a receiver that receives the output signal and produces a large shape signal indicative of at least some of the shapes or spaces having the second or third widths, but failing to produce a signal indicative of at least some of the shapes and spaces having the first width;

a detection circuit that determines which of the shapes and spaces are resolved by identifying a plurality of portions in the large shape signal that each correspond to one of the resolved shapes and spaces;

a first measuring circuit that generates a distance signal indicating distances between each of the plurality of portions in the large shape signal, and that generates a size signal that indicates the size of the resolved shapes and spaces; and a decoding circuit that determines a number and location of the shapes and spaces having a first width by analyzing the distance signal and the width signal, and therefrom produces a signal indicative of the information encoded in the symbol.

49. The apparatus of claim 48, further comprising a slope detection circuit that generates a slope signal for each of the plurality of portions in the large shape signal.

50. The apparatus of claim 48, further comprising a thresholding circuit that defines a plurality of thresholds with respect to the large shape signal and identifies the sizes of the resolved spaces and shapes; and a second measuring circuit that measures a width for each portion at the threshold and produces a measuring signal, the measuring signal indicating which of the resolved shapes and spaces correspond to shapes and spaces having the second width and which of the resolved shapes and spaces have the third width.

51. The apparatus of claim 48 wherein the decoding circuit is a microprocessor.

52. The method of decoding a profile produced from a machine-readable symbol that represents encoded information, the symbol being from a symbology having new identification parity and including a plurality of relatively spaced two-dimensional geometric shapes, the shapes and spaces between the shapes having sizes with at least first, second and third widths in at least one dimension, the second and third widths being greater than the first width, the profile resolving at least some of the shapes and spaces having the second and third widths, but failing to resolve at least some of the shapes and spaces having the first width, the spaces having a reflectivity higher than a reflectivity of the shapes, the method comprising the steps of:

determining the size of the resolved shapes and spaces; and determining the information encoded in the symbol based on the determined size of the resolved shapes and spaces, and the parity of the symbol.

* * * * *